United States Patent
Mukasa

(10) Patent No.: US 11,494,915 B2
(45) Date of Patent: Nov. 8, 2022

(54) IMAGE PROCESSING SYSTEM, IMAGE PROCESSING METHOD, AND PROGRAM

(71) Applicant: RAKUTEN GROUP, INC., Tokyo (JP)

(72) Inventor: Tomoyuki Mukasa, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 343 days.

(21) Appl. No.: 16/631,449

(22) PCT Filed: Aug. 14, 2017

(86) PCT No.: PCT/JP2017/029269
§ 371 (c)(1),
(2) Date: Jan. 15, 2020

(87) PCT Pub. No.: WO2019/035155
PCT Pub. Date: Feb. 21, 2019

(65) Prior Publication Data
US 2020/0184651 A1    Jun. 11, 2020

(51) Int. Cl.
*G06T 7/194* (2017.01)
*G06T 7/73* (2017.01)
(Continued)

(52) U.S. Cl.
CPC .............. *G06T 7/194* (2017.01); *G01B 21/04* (2013.01); *G06N 20/00* (2019.01); *G06T 7/73* (2017.01); *G06T 2207/10028* (2013.01)

(58) Field of Classification Search
None
See application file for complete search history.

(56) References Cited

FOREIGN PATENT DOCUMENTS

JP    2006-250917 A       9/2006
JP    2006250917 A   *   9/2006
(Continued)

OTHER PUBLICATIONS

Christoph Fehn, "Depth-image-based rendering (DIBR), compression, and transmission for a new approach on 3D-TV," Proc. SPIE 5291, Stereoscopic Displays and Virtual Reality Systems XI, (May 21, 2004); https://doi.org/10.1117/12.524762 (Year: 2004).*

(Continued)

*Primary Examiner* — Vu Le
*Assistant Examiner* — Courtney Joan Nelson
(74) *Attorney, Agent, or Firm* — HEA Law PLLC

(57) ABSTRACT

To simplify a configuration for increasing an amount of information on an observation space, taken image acquisition means of an image processing system acquires taken images that have been taken by image taking means, which is movable in a real space. Observation space information acquisition means acquires, based on changes in position of a feature point cloud in the taken images, observation space information including three-dimensional coordinates of the feature point cloud in an observation space. Machine learning means acquires, based on machine learning data on a feature of an object, additional information on a feature of a photographed object shown in the taken images. Integration means integrates the observation space information and the additional information.

13 Claims, 20 Drawing Sheets

(51) Int. Cl.
*G06N 20/00* (2019.01)
*G01B 21/04* (2006.01)

(56) References Cited

FOREIGN PATENT DOCUMENTS

JP     2015079490 A  *  4/2015   ........ G06F 17/30811
JP      6001776 B2  * 10/2016   ........... G06T 7/0065

OTHER PUBLICATIONS

Machine translation of JP-2006250917-A (Year: 2006).*
Machine translation of JP-2015079490-A (Year: 2015).*
Machine translation of JP-6001776-B2 (Year: 2016).*
Andrew J.Davison, "Real-Time Simultaneous Localization and Mapping with a Single Camera", Proceedings of the 9th IEEE International Conference on Computer Vision vol. 2, Oct. 2003, pp. 1403-1410.
Real-time 3D visual SLAM with a hand-held camera (N. Engelhard, F. Endres, J. Hess, J. Sturm, W. Burgard), In Proc. of the RGB-D Workshop on 3D Perception in Robotics at the European Robotics Forum, 2011. (Applicant points out that the year of publication is sufficiently earlier than the effective U.S. filing date and any foreign priority date so that the particular month of publication is not in issue.).
English translation of the International Search Report for PCT/JP2017/029269 dated Oct. 24, 2017.
Search Report dated Feb. 1, 2021, for corresponding EP Patent Application No. 17921736.9 pp. 1-8.
Eigen David et al: "Predicting Depth, Surface Normals and Semantic Labels with a Common Multi-scale Convolutional Architecture", 2015 IEEE International Conference on Computer Vision (ICCV), IEEE, Dec. 7, 2015 (Dec. 7, 2015), pp. 2650-2658, XP032866609, DOI: 10.1109/ICCV.2015.304 [retrieved on Feb. 17, 2016].
Zienkiewicz Jacek et al: "Monocular, Real-Time Surface Reconstruction Using Dynamic Level of Detail", 2016 Fourth International Conference on 3D Vision (3DV), IEEE, Oct. 25, 2016 (Oct. 25, 2016), pp. 37-46, XP033027608, DOI: 10.1109/3DV.2016.82 [retrieved on Dec. 15, 2016].
Zoltan Csaba Marton et al: "On fast surface reconstruction methods for large and noisy point clouds", 2009 IEEE International Conference on Robotics and Auttomation: (ICRA); Kobe, Japan, May 12-17, 2009, IEEE, Piscataway, NJ, USA, May 12, 2009 (May 12, 2009), pp. 3218-3223, XP031509862, ISBN: 978-1-4244-2788-8.

* cited by examiner

FIG.4
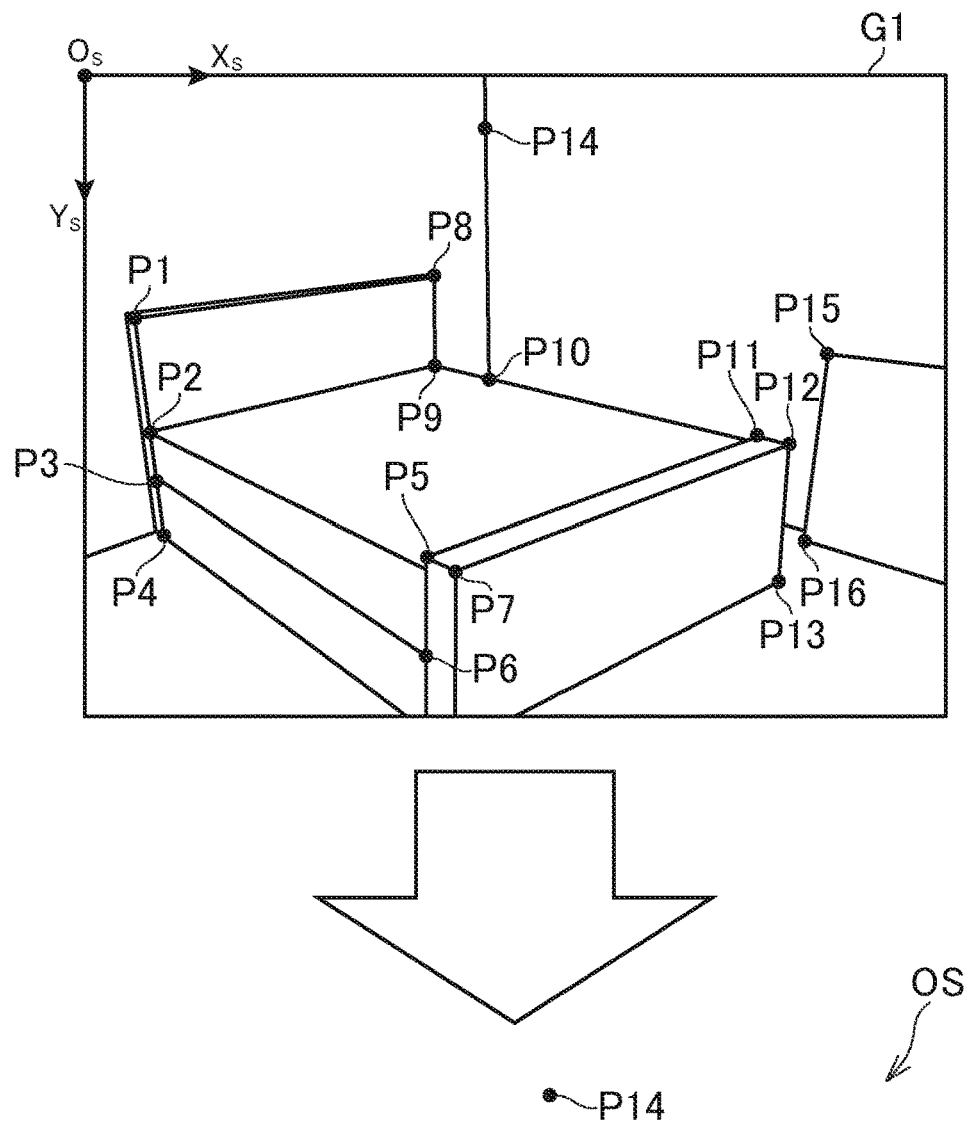
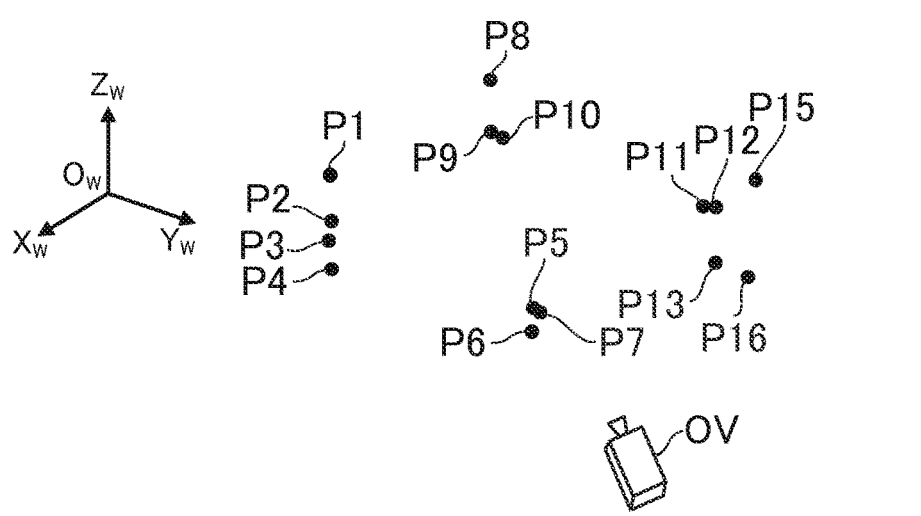

FIG.5
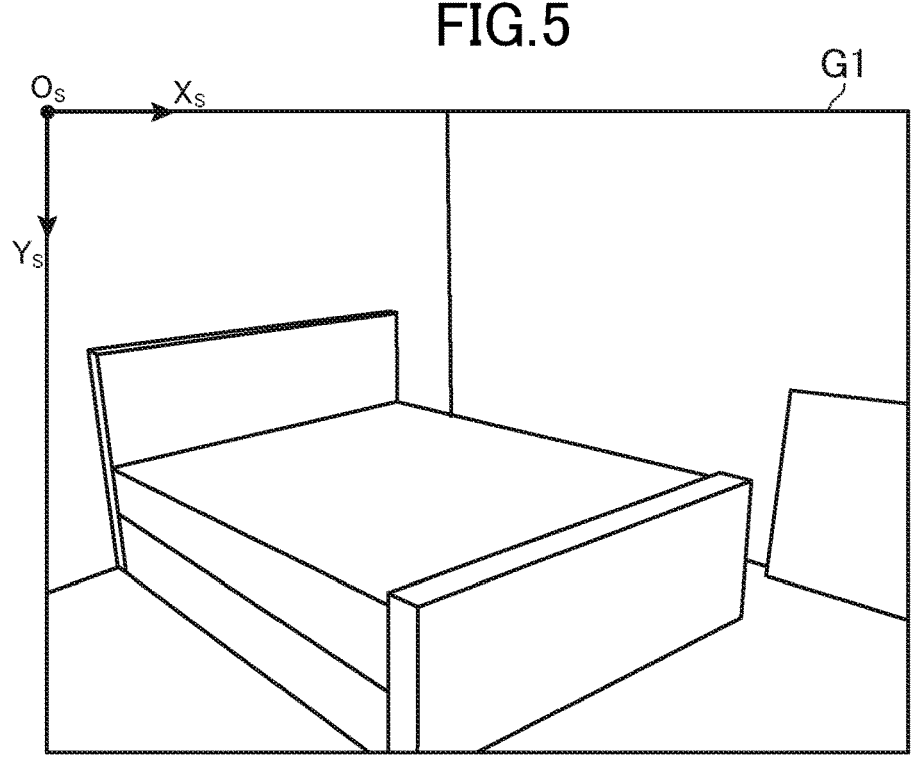
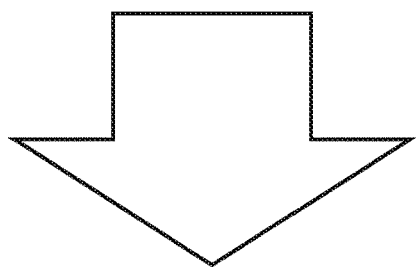
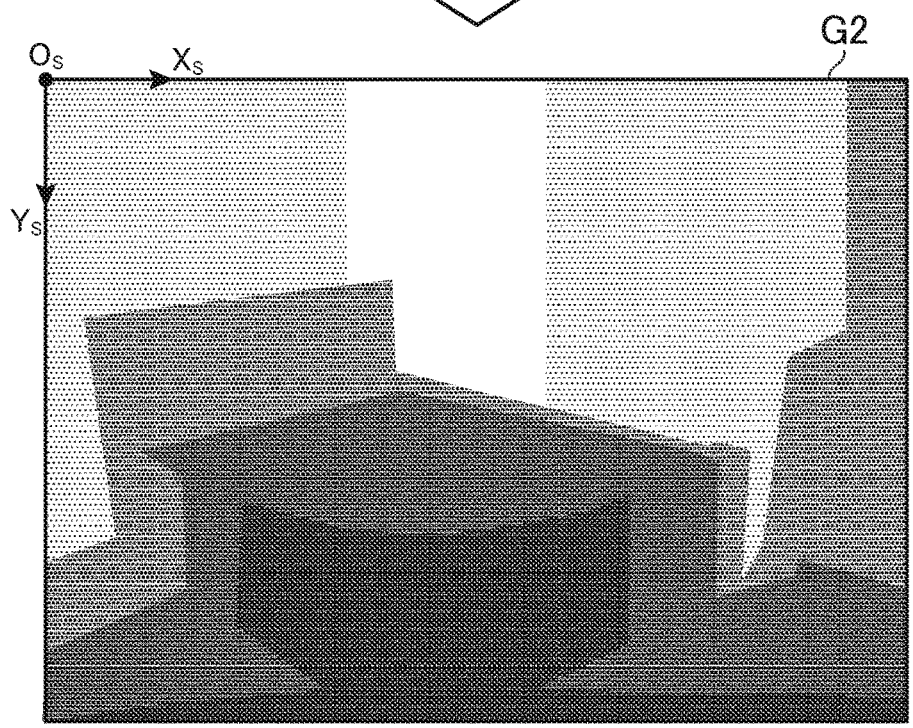

FIG.6
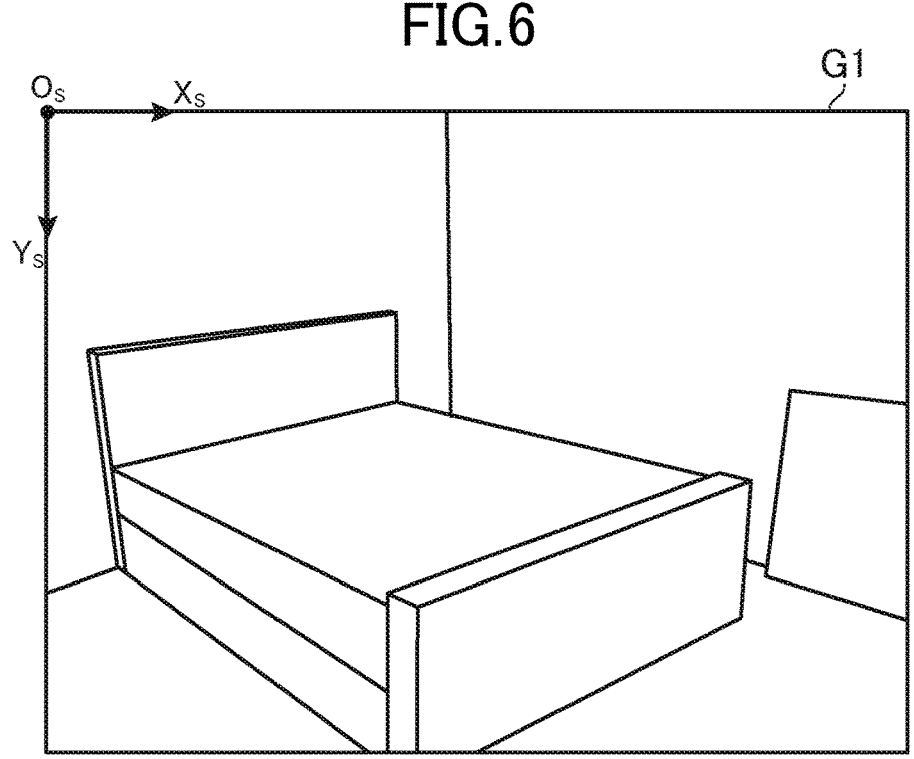
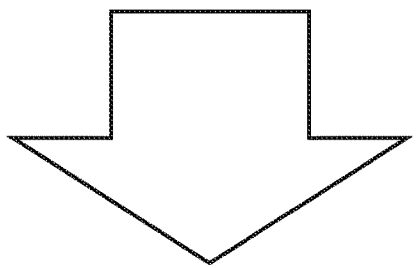
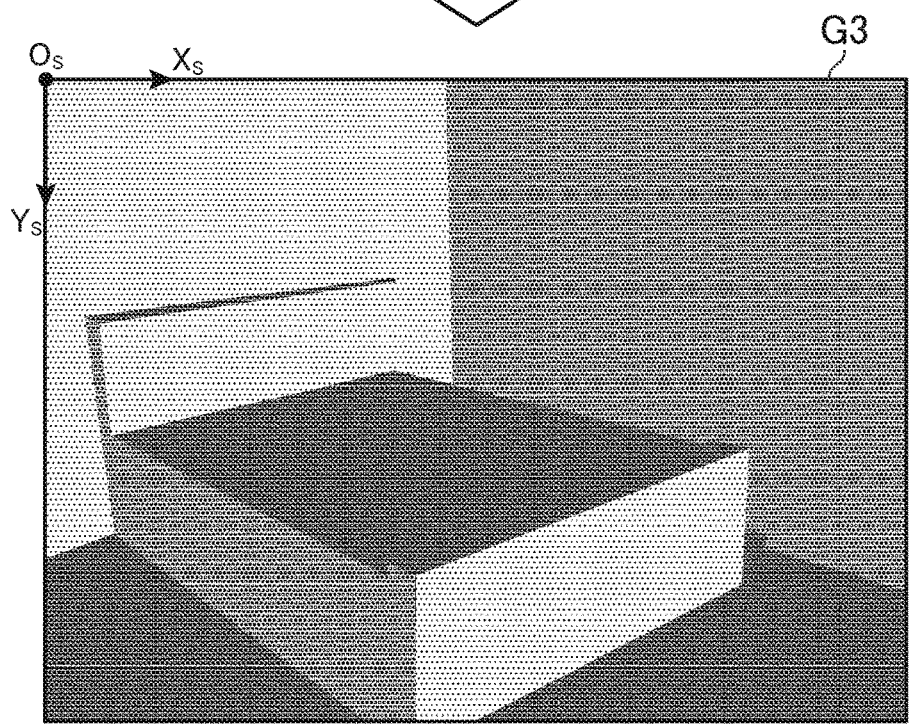

FIG.18
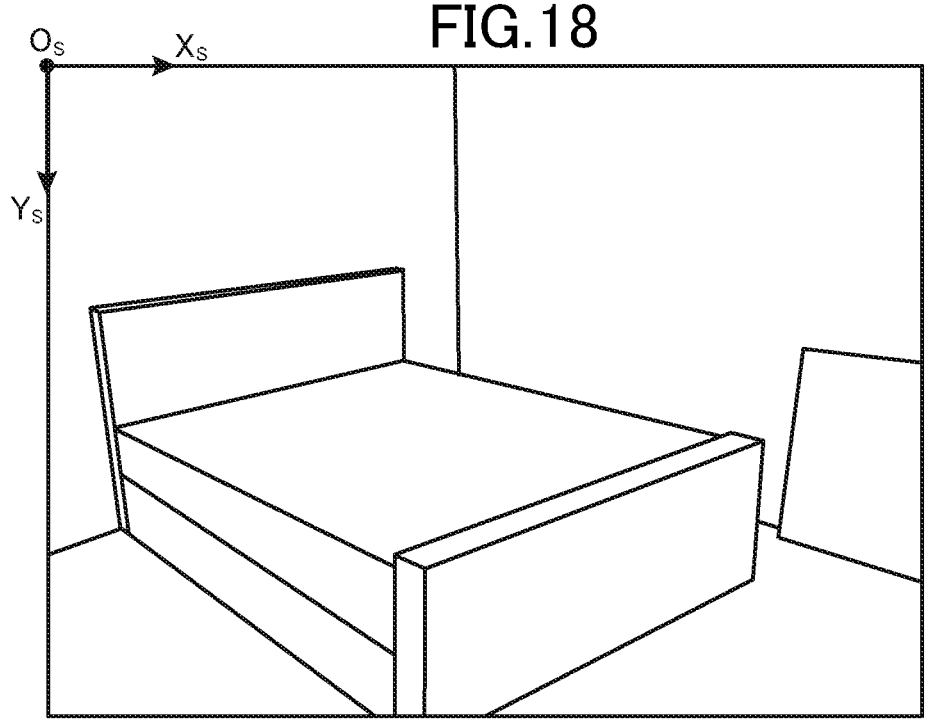
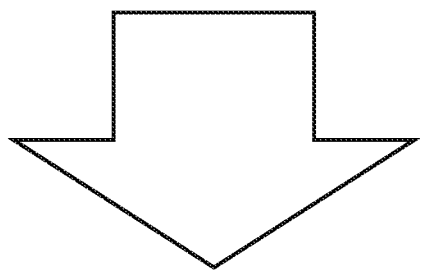
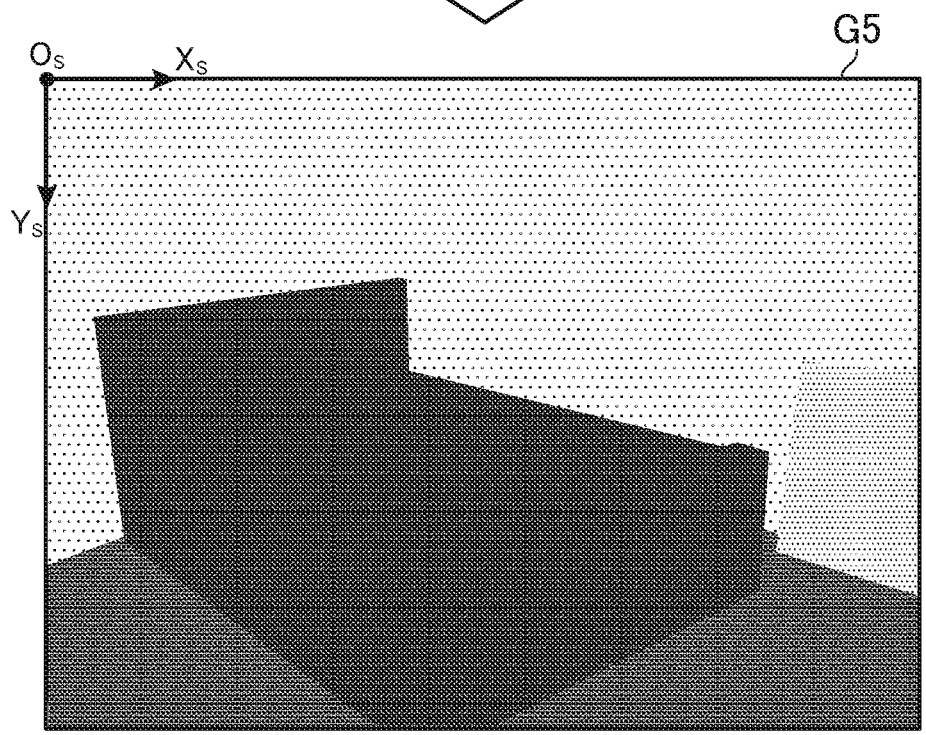

FIG.19
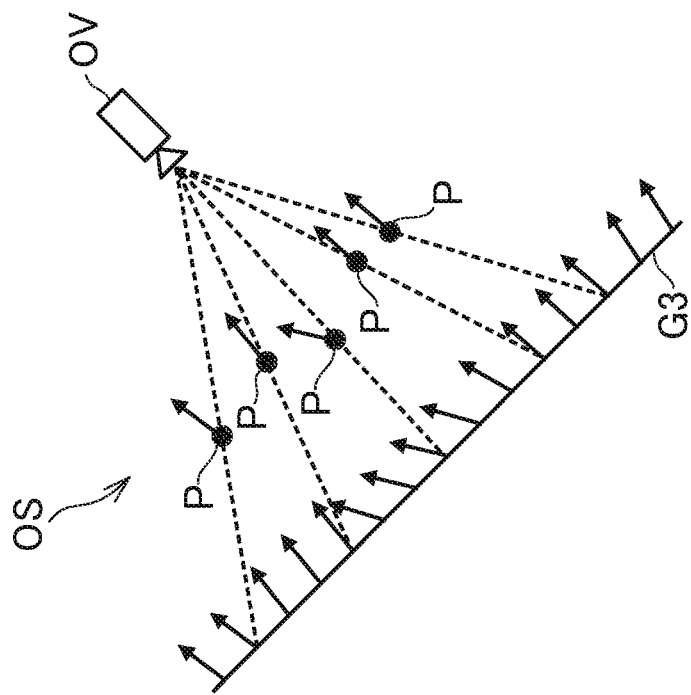
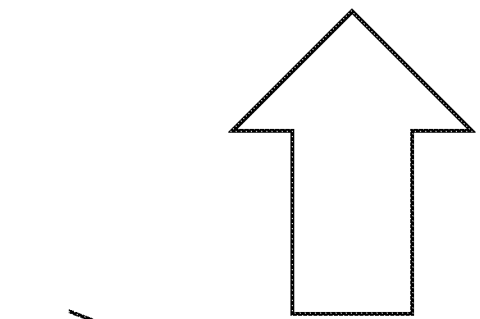
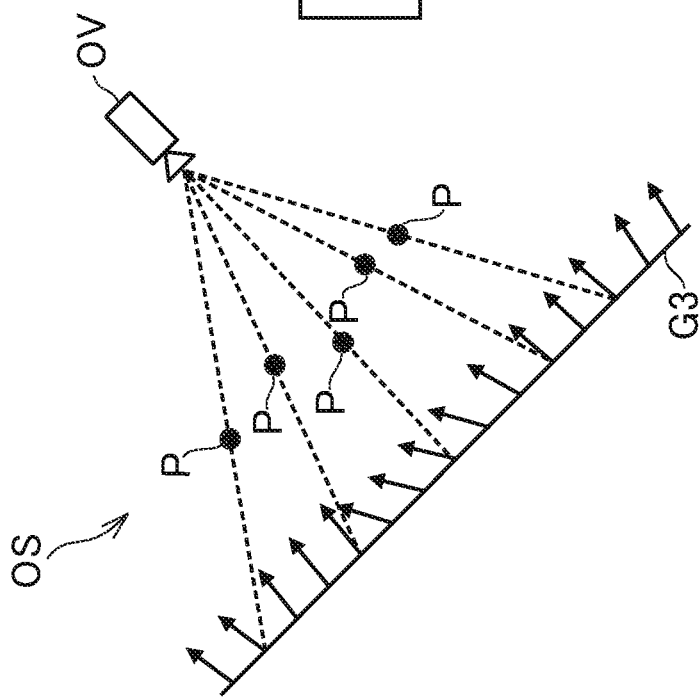

IMAGE PROCESSING SYSTEM, IMAGE PROCESSING METHOD, AND PROGRAM

CROSS REFERENCE TO RELATED APPLICATIONS

This application is a National Stage of International Application No. PCT/JP2017/029269 filed on Aug. 14, 2017. The contents of the above document is incorporated herein by reference in its entirety.

TECHNICAL FIELD

The present invention relates to an image processing system, an image processing method, and a program.

BACKGROUND ART

In recent years, there has been investigated a technology of analyzing taken images that have been taken by a camera, and reproducing a view of a real space in an observation space. In Non Patent Literature 1, for example, there is described a technology called "simultaneous localization and mapping (SLAM)" of generating, based on changes in position of a feature point cloud in taken images that have been taken by an RGB camera (so-called "monocular camera") including no depth camera, a 3D map including three-dimensional coordinates of the feature point cloud in the observation space. Moreover, in Non Patent Literature 2, for example, there is described a technology of generating a 3D map based on taken images that have been taken by an RGB-D camera including an RGB camera and a depth camera.

CITATION LIST

Non-Patent Literature

[NPL 1] Andrew J. Davison, "Real-Time Simultaneous Localization and Mapping with a Single Camera", Proceedings of the 9th IEEE International Conference on Computer Vision Volume 2, 2003, pp. 1403-1410

[NPL 2] Real-time 3D visual SLAM with a hand-held camera (N. Engelhard, F. Endres, J. Hess, J. Sturm, W. Burgard), In Proc. of the RGB-D Workshop on 3D Perception in Robotics at the European Robotics Forum, 2011

SUMMARY OF INVENTION

Technical Problem

However, with the technology of Non Patent Literature 1, only the three-dimensional coordinates of the feature point cloud extracted from the taken images are shown in the 3D map, and an amount of information on the observation space cannot be sufficiently increased. In this regard, with the technology of Non Patent Literature 2, a depth of a surface of a photographed object can be measured by the depth camera, and a three-dimensional shape of the photographed object can be expressed. Therefore, the amount of information on the observation space can be increased. However, it is required to prepare the depth camera, and a configuration becomes complicated.

One or more embodiments of the present invention have been made in view of the above-mentioned issue, and therefore has an object to simplify a configuration for increasing an amount of information on an observation space.

Solution to Problem

In response to the above-mentioned issue, an image processing system according to one embodiment of the present invention includes: taken image acquisition means for acquiring taken images that have been taken by image taking means, which is movable in a real space; observation space information acquisition means for acquiring, based on changes in position of a feature point cloud in the taken images, observation space information including three-dimensional coordinates of the feature point cloud in an observation space; machine learning means for acquiring, based on machine learning data on a feature of an object, additional information on a feature of a photographed object shown in the taken images; and integration means for integrating the observation space information and the additional information.

The image processing method according to one embodiment of the present invention includes: a taken image acquisition step of acquiring taken images that have been taken by image taking means, which is movable in a real space; an observation space information acquisition step of acquiring, based on changes in position of a feature point cloud in the taken images, observation space information including three-dimensional coordinates of the feature point cloud in an observation space; a machine learning step of acquiring, based on machine learning data on a feature of an object, additional information on a feature of a photographed object shown in the taken images; and an integration step of integrating the observation space information and the additional information.

A program according to one embodiment of the present invention causes a computer to function as: taken image acquisition means for acquiring taken images that have been taken by image taking means, which is movable in areal space; observation space information acquisition means for acquiring, based on changes in position of a feature point cloud in the taken images, observation space information including three-dimensional coordinates of the feature point cloud in an observation space; machine learning means for acquiring, based on machine learning data on a feature of an object, additional information on a feature of a photographed object shown in the taken images; and integration means for integrating the observation space information and the additional information.

In one aspect of the present invention, the additional information includes two-dimensional feature amount information in which a position of the photographed object in the taken images and a feature amount regarding the photographed object are associated with each other, the observation space information acquisition means is configured to estimate a position of the image taking means based on the changes in position of the feature point cloud, and set an observation viewpoint in the observation space based on a result of the estimation, and the integration means is configured to execute processing based on a result of comparison between two-dimensional observation information, which shows a view of the observation space as seen from the observation viewpoint, and the two-dimensional feature amount information.

In one aspect of the present invention, the feature amount includes a depth of the photographed object estimated based on the machine learning data, in the two-dimensional observation information, a position of the feature point cloud in a two-dimensional space, and a depth of the feature point cloud in the observation space are associated with each other, and the integration means is configured to set a mesh of the photographed object in the observation space based on the two-dimensional feature amount information, and change a scale of the mesh based on the result of the comparison between the two-dimensional observation information and the two-dimensional feature amount information.

In one aspect of the present invention, the integration means is configured to partially change the mesh after changing the scale of the mesh based on the result of the comparison between the two-dimensional observation information and the two-dimensional feature amount information.

In one aspect of the present invention, the additional information includes information on a three-dimensional shape of the photographed object, which is estimated based on the machine learning data.

In one aspect of the present invention, the additional information includes information on a mesh of the photographed object.

In one aspect of the present invention, the integration means is configured to set the mesh in the observation space based on the additional information, and change the mesh based on the observation space information.

In one aspect of the present invention, the integration means is configured to change a mesh portion of the mesh that corresponds to the three-dimensional coordinates of the feature point cloud indicated by the observation space information, and then change a mesh portion around the mesh portion.

In one aspect of the present invention, the observation space information acquisition means is configured to estimate a position of the image taking means based on the changes in position of the feature point cloud, and set an observation viewpoint in the observation space based on a result of the estimation, and the integration means is configured to change each mesh portion based on an orientation of each mesh portion with respect to the observation viewpoint.

In one aspect of the present invention, the additional information includes information on a normal of the photographed object.

In one aspect of the present invention, the additional information includes information on a classification of the photographed object.

In one aspect of the present invention, the image taking means is configured to take images of the real space based on a predetermined frame rate, and the observation space information acquisition means and the machine learning means are configured to execute processing based on one of the taken images that is taken in the same frame.

Advantageous Effects of Invention

According to one or more embodiments of the present invention, it is possible to simplify the configuration for increasing the amount of information on the observation space.

BRIEF DESCRIPTION OF DRAWINGS

FIG. 4 is a diagram for illustrating an example of three-dimensional coordinates of a feature point cloud.

FIG. 5 is a diagram for illustrating an example of a depth image.

FIG. 6 is a diagram for illustrating an example of a normal image generated based on the taken image.

FIG. 18 is a diagram for illustrating an example of a classification image.

FIG. 19 is a diagram for illustrating an example of processing to be executed by the integration unit.

DESCRIPTION OF EMBODIMENTS

1. Hardware Configuration of Image Processing System

Now, a description is given of an example of an image processing system according to an embodiment of the present invention. In this embodiment, a case in which the image processing system is implemented by one computer is described, but as in modification examples to be described later, the image processing system may be implemented by a plurality of computers.

Figure 1:
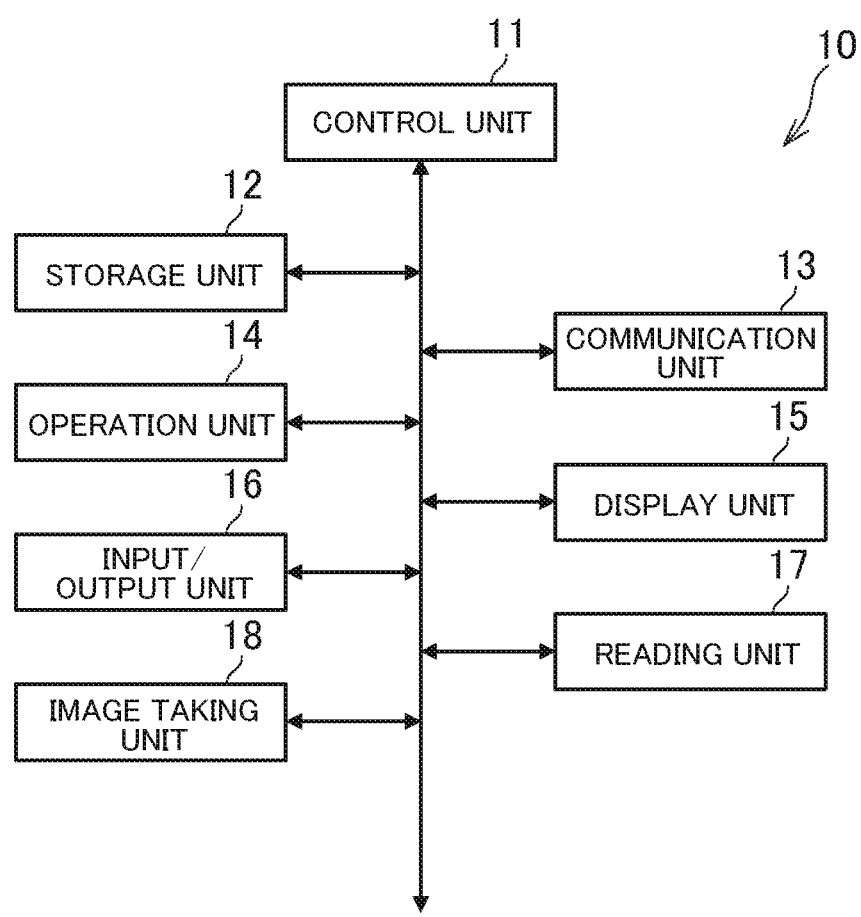
FIG. 1 is a diagram for illustrating a hardware configuration of an image processing apparatus.

FIG. 1 is a diagram for illustrating a hardware configuration of an image processing apparatus. An image processing apparatus 10 is a computer configured to execute image processing, and is a cell phone (including a smart phone), a personal digital assistant (including a tablet computer), a personal computer, or a server computer, for example. As illustrated in FIG. 1, the image processing apparatus 10 includes a control unit 11, a storage unit 12, a communication unit 13, an operation unit 14, a display unit 15, an input/output unit 16, a reading unit 17, and an image taking unit 18.

The control unit 11 includes, for example, at least one microprocessor. The control unit 11 executes processing in accordance with programs and data stored in the storage unit 12. The storage unit 12 includes a main memory unit and an auxiliary memory unit. For example, the main memory unit is a volatile memory, for example, a RAM, and the auxiliary memory unit is a non-volatile memory such as a hard disk drive or a flash memory. The communication unit 13 is a communication interface for wired communication or wireless communication, and performs data communication via the network. The operation unit 14 is an input device to be operated by a user, and includes, for example, a pointing device such as a touch panel and a mouse, or a keyboard. The operation unit 14 transmits details of operation by the user to the control unit 11.

The display unit 15 is, for example, a liquid crystal display unit or an organic EL display unit. The display unit 15 displays a screen in accordance with an instruction of the control unit 11. The input/output unit 16 is an input/output interface, and includes a USB port, for example. The input/output unit 16 is used to perform data communication to/from an external device. The reading unit 17 reads a computer-readable information storage medium, and includes an optical disc drive or a memory card slot, for example. The image taking unit 18 includes at least one camera configured to take a still image or a moving image, and includes a CMOS image sensor, a CCD image sensor, or other image sensors, for example. The image taking unit 18 is capable of consecutively taking images of a real space. For example, the image taking unit 18 may take images at a predetermined frame rate, or may take images irregularly without particularly setting a frame rate.

Programs and data, which are described to be stored in the storage unit 12, may be supplied from another computer via a network, or may be supplied from a computer-readable information storage medium (for example, USB memory, SD card, or optical disc) via the input/output unit 16 or the reading unit 17. Moreover, the display unit 15 and the image taking unit 18 may be, instead of being incorporated in the image processing apparatus 10, outside the image processing apparatus 10 and connected thereto via the input/output unit 16. Further, the hardware configuration of the image processing apparatus 10 is not limited to the above-mentioned example, and various kinds of hardware can be applied.

2. Outline of Processing to be Executed by Image Processing Apparatus

The image processing apparatus 10 generates, based on taken images that have been taken by the image taking unit 18, an observation space reproducing a view of a real space. The real space is a physical space of which the image taking unit 18 takes images. The observation space is a virtual three-dimensional space, and is a space defined inside the image processing apparatus 10. The observation space includes a point cloud representing a photographed object. The photographed object is an object in the real space appearing in the taken images, and may also be called as a "subject". Stated differently, the photographed object is a part of the real space appearing in the taken images.

The point cloud in the observation space is information for expressing a three-dimensional shape of the photographed object in the observation space, and is a vertex group forming a mesh. The mesh is information also called as a "polygon", and is a constituent element of a three-dimensional object (3D model) representing the photographed object. The image taking unit 18 may take images of any location, but in this embodiment, a description is given of a case in which the image taking unit 18 takes images of a view inside a room.

Figure 2:
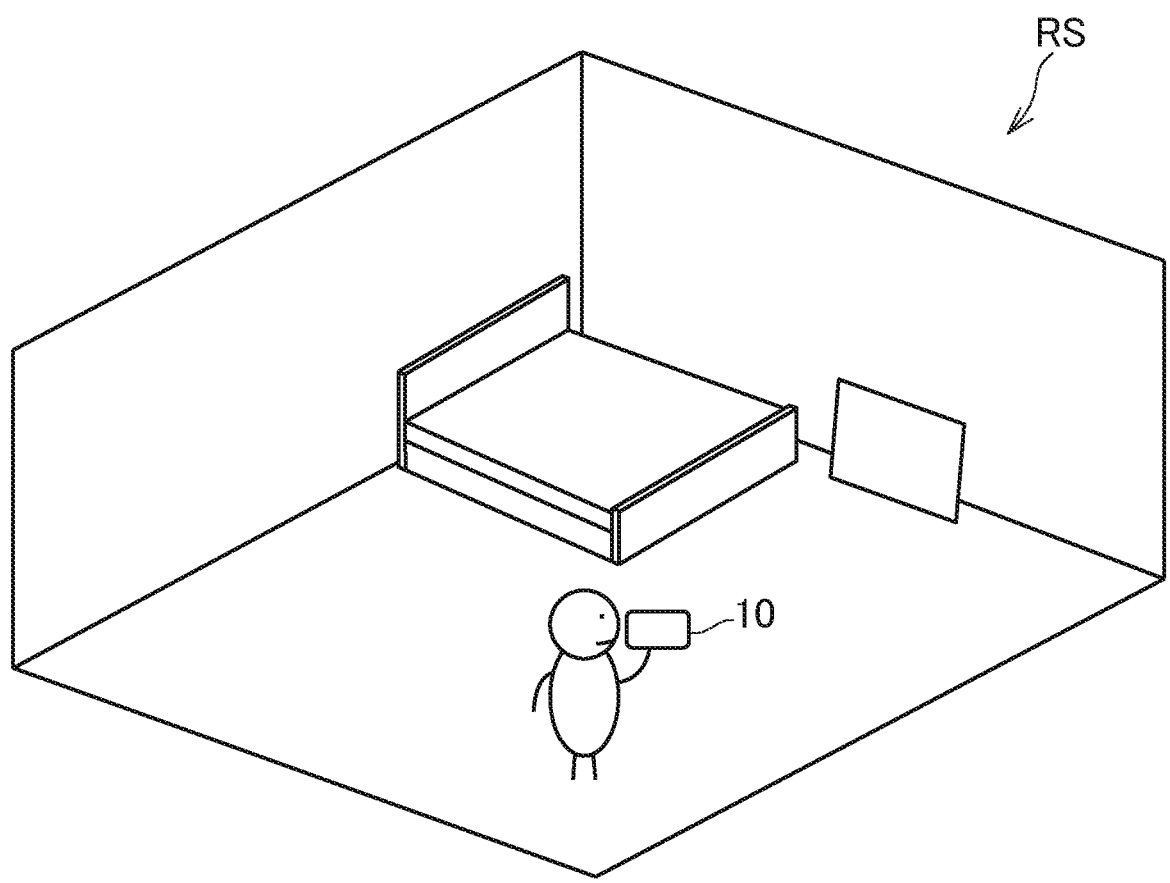
FIG. 2 is a diagram for illustrating how an image taking unit takes images of a real space.

FIG. 2 is a diagram for illustrating how the image taking unit 18 takes images of the real space. As illustrated in FIG. 2, in this embodiment, the image taking unit 18 takes images of the inside of a room surrounded by a plurality of surfaces (for example, floor, walls, and ceiling). In the example of FIG. 2, a bed and a painting are arranged in a real space RS. The user moves while holding the image processing apparatus 10 to take images of any location. For example, the image taking unit 18 consecutively takes images of the real space RS based on the predetermined frame rate to generate the taken images.

Figure 3:
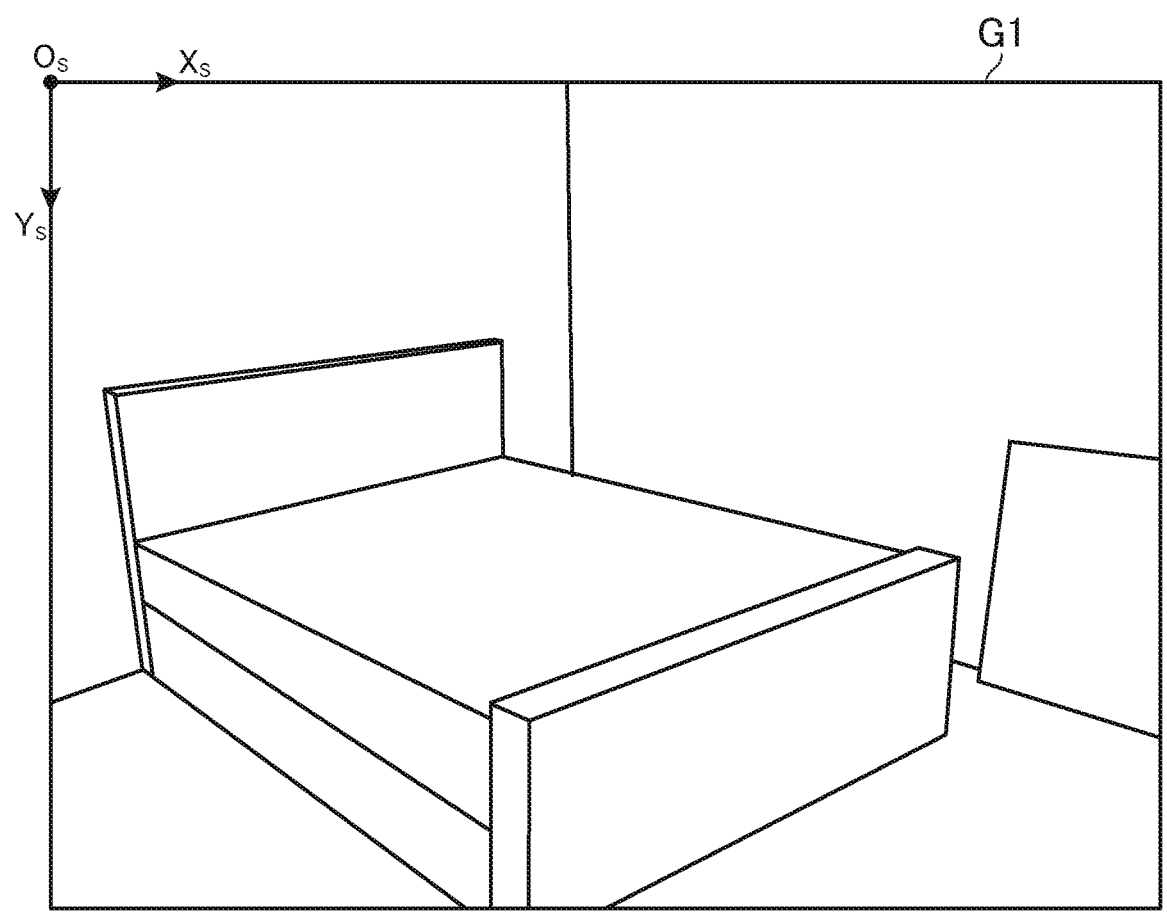
FIG. 3 is a diagram for illustrating an example of a taken image.

FIG. 3 is a diagram for illustrating an example of a taken image. As illustrated in FIG. 3, a taken image G1 includes, as photographed objects, the walls, the floor, the bed, and the painting, which are located within a photographic range of the image taking unit 18. In this embodiment, screen coordinate axes (Xs axis and Ys axis) are set with the upper left of the taken image G1 being an origin Os, and a position in the taken image G1 is expressed as two-dimensional coordinates in a screen coordinate system.

For example, the image processing apparatus 10 extracts a feature point cloud from the taken image G1, and calculates three-dimensional coordinates of the feature point cloud in the observation space with the use of the SLAM technology. A feature point is a point representing a distinctive portion in an image, and represents a part of a contour of the photographed object or a part at which the color of the photographed object is changed, for example. The feature point cloud is a collection of a plurality of feature points.

FIG. 4 is a diagram for illustrating an example of the three-dimensional coordinates of the feature point cloud. In FIG. 4, feature points P1 to P16 extracted from the taken image Glare illustrated. The feature points P1 to P16 are hereinafter collectively referred to as a "feature point cloud P" when distinction among those feature points is not particularly required. In this embodiment, world coordinate axes (Xw axis, Yw axis, and Zw axis) are set with a predetermined position in an observation space OS being an origin Ow, and a position in the observation space OS is expressed by three-dimensional coordinates in a world coordinate system.

In this embodiment, the image processing apparatus 10 not only calculates the three-dimensional coordinates of the feature point cloud P with the use of the SLAM technology, but also estimates a position and an orientation of the image taking unit 18 in the real space RS. The image processing apparatus 10 sets the three-dimensional coordinates of the feature point cloud P in the observation space OS, and sets an observation viewpoint OV in the observation space OS so as to correspond to the position and the orientation of the image taking unit 18. The observation viewpoint OV is also called a "virtual camera", and is a viewpoint in the observation space OS.

The feature point cloud P is merely the collection of feature points representing a part of, for example, the contour of the photographed object, and as illustrated in FIG. 4, a density of the feature point cloud P is not high enough to express a surface of the photographed object. In other words, the observation space OS, in which the three-dimensional coordinates of the feature point cloud P are set, is sparse point cloud data, and does not have an amount of information of a level that can express the surface of the photographed object in detail, for example.

Therefore, the image processing apparatus 10 in this embodiment estimates the three-dimensional shape of the photographed object with the use of machine learning (deep learning), and integrates the estimated three-dimensional shape and the three-dimensional coordinates of the feature point cloud P to increase the amount of information of the observation space OS. Specifically, the image processing apparatus 10 roughly estimates the three-dimensional shape of the photographed object by machine learning, and corrects the estimated three-dimensional shape to match the three-dimensional coordinates of the feature point cloud P, which are actually measured values. For example, the image processing apparatus 10 acquires, as a result of the estimation of the three-dimensional shape of the photographed object, the following two images: a depth image and a normal image. It is sufficient that the estimation result is expressed as two-dimensional information, and it is not required that the estimation result be expressed in a form of an image. For example, the estimation result may be data indicating a combination of the two-dimensional coordinates and information on a depth or a normal, and may be data in a list form or a tabular form, for example.

FIG. 5 is a diagram for illustrating an example of the depth image. A depth image G2 has the same size (the same numbers of pixels longitudinally and laterally) as that of the taken image G1, and is an image for showing depths of the photographed object. A depth is a depth dimension of the photographed object, and is a distance between the image taking unit 18 and the photographed object. A pixel value of each pixel of the depth image G2 indicates a depth of the pixel. In other words, a pixel value of each pixel in the depth image G2 indicates a distance between the photographed object represented by the pixel and the image taking unit 18. A pixel value is a numerical value assigned to each pixel, and is information also called as "color", "luminance", or "lightness".

The depth image G2 may be a color image or a grayscale image. In the example of FIG. 5, a pixel value of the depth image G2 is schematically illustrated as a darkness of a dot, with a darker dot indicating a shallower depth (shorter distance), and a lighter dot indicating a deeper depth (longer distance). In other words, a photographed object represented by pixels of dark dots is located on the front side when the photographed object is seen from the image taking unit 18, and a photographed object represented by pixels of light dots is located on the back side when the photographed object is seen from the image taking unit 18. For example, dots of the bed and other such portions near the image taking unit 18 are dark, and dots of a wall and other such portions away from the image taking unit 18 are light.

FIG. 6 is a diagram for illustrating an example of a normal image generated based on the taken image G1. A normal image G3 has the same size (same number of pixels longitudinally and laterally) as that of the taken image G1, and is an image for showing normals of the photographed object. A normal is a straight line that crosses the surface of the photographed object perpendicularly. A pixel value of each pixel of the normal image G3 indicates the direction (vector information) of a normal of the pixel. In other words, a pixel value of each pixel of the normal image G3 indicates the direction of a normal of the photographed object photographed in the pixel.

The normal image G3 may be a color image or a grayscale image. In the example of FIG. 6, a pixel value of the normal image G3 is schematically illustrated as a darkness of a dot, with a darker dot indicating a normal directed to a vertical direction (Zw-axis direction), and a lighter dot indicating a normal directed to a horizontal direction (Xw-axis direction or Yw-axis direction). In other words, a photographed object represented by pixels of dark dots has a surface directed to the vertical direction, and a photographed object represented by pixels of light dots has a surface directed to the horizontal direction.

For example, dots of portions having surfaces directed to the vertical direction, such as the floor and an upper surface of the bed, are dark, and dots of portions having surfaces directed to the horizontal direction, such as the walls and side surfaces of the bed, are light. In FIG. 6, dots are shown darker in the Xw-axis direction than in the Yw-axis direction. Therefore, for example, a surface of the wall on the right side (with normals in the Xw-axis direction) as seen from the image taking unit 18 are shown with darker dots than those of a surface of the wall on the left side (with normals in the Yw-axis direction).

Each of the depth image G2 and the normal image G3 is information indicating the three-dimensional shape of the photographed object, and the image processing apparatus 10 can estimate a mesh of the photographed object based on those images. Although the depth image G2 and the normal image G3 are information obtained by machine learning and have a certain degree of accuracy, the depth image G2 and the normal image G3 are not actually measured values measured at the site by the image processing apparatus 10 and thus do not have particularly high accuracy.

Therefore, even when the meshes estimated based on the depth image G2 and the normal image G3 are directly set in the observation space OS to increase the amount of information, there may be cases of different scales or different details of the meshes, and the accuracy of the observation space OS cannot be increased. Therefore, the image processing apparatus 10 increases the amount of information of the observation space OS while increasing the accuracy of the three-dimensional shape by integrating the three-dimensional coordinates of the feature point cloud P, which are the actually measured values, and the depth image G2 and the normal image G3.

Figure 7:
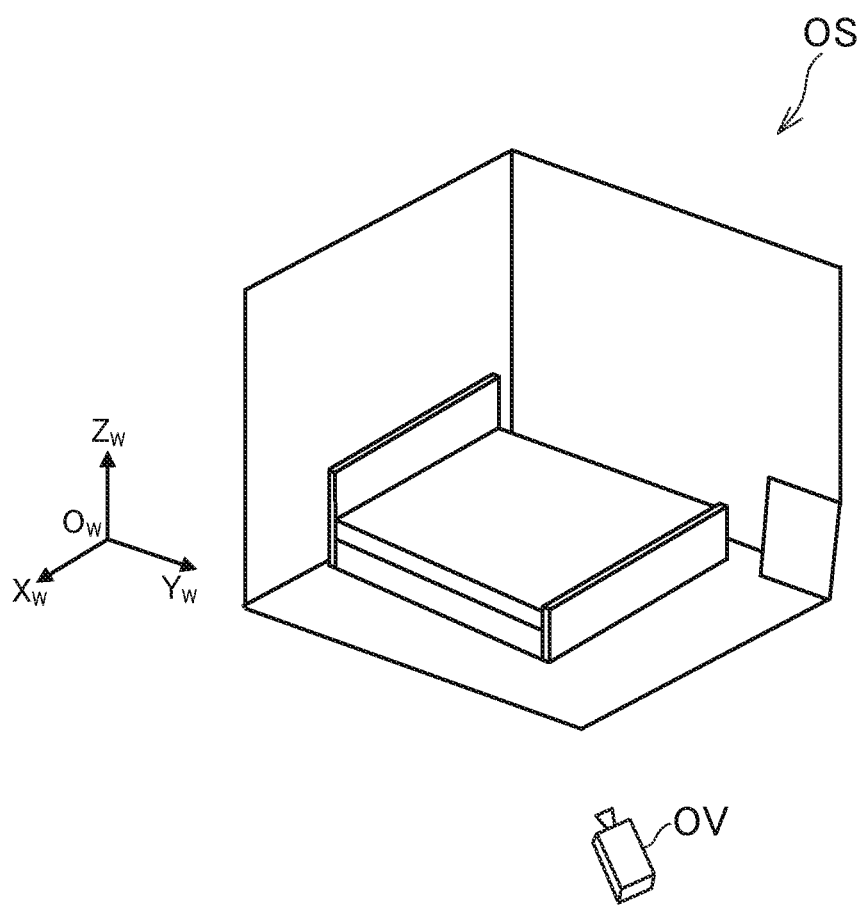
FIG. 7 is a diagram for illustrating an example of an integrated observation space.

FIG. 7 is a diagram for illustrating an example of the integrated observation space OS. In FIG. 7, a collection of point clouds in the observation space OS is schematically illustrated as a solid line. As illustrated in FIG. 7, the density of the point clouds in the observation space OS can be increased with the use of the machine learning, and the density of the point clouds is high enough to express surfaces of the photographed object. In other words, the integrated observation space OS is dense point cloud data, and has an amount of information with which the surface of the photographed object can be expressed in detail, for example.

It is only the inside of the photographic range of the image taking unit 18 that can be reproduced in the observation space OS, and hence a view of the outside of the photographic range (for example, blind spot behind the image taking unit 18) is not reproduced. Therefore, in order to reproduce the entire room, the user moves while holding the image processing apparatus 10 to thoroughly take images of the inside of the room, and the image processing apparatus 10 repeats the above-mentioned processing to reproduce the entire room.

As described above, the image processing apparatus 10 in this embodiment can increase the amount of information of the observation space OS without the use of a depth camera and other such configurations by integrating the three-dimensional coordinates of the feature point cloud P, which are the actually measured values, and the depth image G2 and the normal image G3, which are acquired with the use of the machine learning. Now, the image processing apparatus 10 is described in detail.

3. Functions to be Implemented in Image Processing Apparatus

Figure 8:
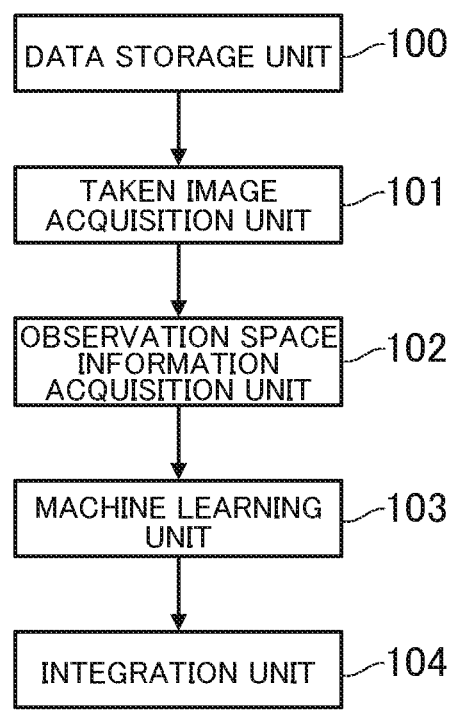
FIG. 8 is a functional block diagram for illustrating an example of functions to be implemented in the image processing apparatus.

FIG. 8 is a functional block diagram for illustrating an example of functions to be implemented in the image processing apparatus 10. As illustrated in FIG. 8, in this embodiment, a description is given of a case in which a data storage unit 100, a taken image acquisition unit 101, an observation space information acquisition unit 102, a machine learning unit 103, and an integration unit 104 are implemented.

[3-1. Data Storage Unit]

The data storage unit 100 is implemented mainly by the storage unit 12. The data storage unit 100 stores data required to generate the observation space OS reproducing the view of the real space RS.

For example, the data storage unit 100 stores machine learning data to be used in the machine learning. The machine learning data is data on features of various objects. For example, the machine learning data is data indicating features of an appearance of an object, and may indicate various features such as a three-dimensional shape, a contour, a size, a color, and a pattern of the object. The term "three-dimensional shape" as used herein means irregularities or an orientation of a surface.

In the machine learning data, for each object, feature information on features of the object is stored. Moreover, even the same objects have different features such as the three-dimensional shape, the size, the contour, the color, and the pattern, and hence the machine learning data may be prepared to encompass the various features.

When a bed is described as an example of the object, there are various types of bed frames, such as a pipe bed and a bunk bed, and there are beds of a large number of three-dimensional shapes and contours. Moreover, there are various types of beds, such as single-sized or double-sized, and there are beds of a large number of sizes. Similarly, there are beds of various types of colors and patterns, and hence the machine learning data stores the feature information so as to encompass known beds.

Further, even the same bed looks different depending on the angle, and hence feature information for cases in which the bed is seen from various angles is stored in the machine learning data. The bed has been given as an example in this case, but similarly for objects (for example, furniture, household electric appliances, clothing, vehicles, and miscellaneous goods) other than beds, feature information in cases where various types of objects are seen from various angles is stored in the machine learning data.

In this embodiment, the depth image G2 and the normal image G3 are acquired by the machine learning, and hence it is assumed that a depth and a normal of the object are stored as the feature information. Therefore, as an example of the machine learning data, depth learning data on the depth of the object, and normal learning data on the normal of the object are described.

For example, the depth learning data and the normal learning data are generated when an image of the object is taken by an RGB-D camera. The RGB-D camera can measure the depth of the object arranged in the real space RS, and hence the depth learning data is generated based on depth information, which is an actually measured value. Moreover, the depth of the object is information with which the three-dimensional shape (irregularities on the surface of the object) can be identified, and a normal direction of the surface of the object can also be acquired based on the depth information measured by the RGB-D camera. Therefore, the normal learning data is also generated based on the normal direction, which is an actually measured value.

As the machine learning data and an algorithm for the machine learning per se, known data and algorithm can be used, and data and algorithm in a so-called convolutional neural network (CNN) described in "Predicting Depth, Surface Normals and Semantic Labels with a Common Multi-Scale Convolutional Architecture" (http://www.cs.nyu.edu/~deigen/dn1/, https://arxiv.org/pdf/1411.4734v4.pdf) may be used, for example. Moreover, the feature information stored in the machine learning data may be any information indicating a feature of the object, and is not limited to the depth and the normal. For example, the feature information may indicate the contour, the size, the color, or the pattern of the object.

The data storage unit 100 also stores observation space information indicating a view of the observation space OS, for example. For example, in the observation space information, information on the photographed object, and observation viewpoint parameters for the observation viewpoint OV are stored. The information on the photographed object is the point cloud corresponding to the photographed object, and includes the three-dimensional coordinates of the feature point cloud P, and coordinates of vertices of the mesh (three-dimensional object representing the photographed object), for example. The observation viewpoint parameters are the position, the orientation, and an angle of view of the observation viewpoint OV, for example. The orientation of the observation viewpoint OV may be expressed by three-dimensional coordinates of a point of gaze, or by vector information indicating a line-of-sight direction.

The data stored in the data storage unit 100 is not limited to the example described above. For example, the data storage unit 100 may store the taken images G1 in time sequence. Moreover, for example, the data storage unit 100 may store two-dimensional coordinates of the feature point cloud P, which are extracted from the taken images G1, in time sequence, or store vector information indicating changes in position of the feature point cloud P in time sequence. Further, when augmented reality is provided to the user, for example, the data storage unit 100 may store information on a three-dimensional object indicating an object to be combined. The "object to be combined" is a hypothetical object to be displayed together with the taken image G1, and is a hypothetical animal (including a character modeled on a person), furniture, household electric appliances, clothing, a vehicle, a toy, or a miscellaneous good, for example. The object to be combined may move in the observation space OS, or stand still in place without moving in particular.

[3-2. Taken Image Acquisition Unit]

The taken image acquisition unit 101 is implemented mainly by the control unit 11. The taken image acquisition unit 101 acquires the taken images G1 taken by the image taking unit 18, which is movable in the real space.

The image taking unit 18 being movable in the real space RS means that a position and an orientation of the image taking unit 18 can be changed, and that a casing including the image taking unit 18 can be moved, a posture of the casing can be changed, or the casing can be rotated, for example. Stated differently, the image taking unit 18 being movable in the real space RS means that the photographic range (field of view) of the image taking unit 18 can be changed. It is not always required that the image taking unit 18 be moved at all times, and may stay temporarily at the current location so that the position and the orientation are not changed.

In this embodiment, the image taking unit 18 takes images of the real space RS based on the predetermined frame rate, and hence the taken image acquisition unit 101 acquires the taken images G1 that have been taken at the predetermined frame rate by the image taking unit 18.

A frame rate is the number of processing cycles per unit time, and is the number of still images (number of frames) per unit time in a moving image. The frame rate may be a fixed value, or may be specified by the user. For example, when the frame rate is N fps (N: natural number, fps: frames per second), a length of each frame is 1/N second, the image taking unit 18 takes an image of the real space RS for each frame, which is a unit of processing, to generate the taken images G1, and the taken image acquisition unit 101 consecutively acquires the taken images G1 generated by the image taking unit 18.

In this embodiment, the taken image acquisition unit 101 acquires in real time the taken images G1 taken by the image taking unit 18. In other words, the taken image acquisition unit 101 acquires a taken image G1 immediately after the image taking unit 18 generates the taken image G1. The taken image acquisition unit 101 acquires the taken image G1 within predetermined time from a time point at which the image taking unit 18 generates the taken image G1.

It is not particularly required that the taken images G1 be acquired in real time, and in this case, the taken image acquisition unit 101 may acquire image data (that is, data of still or moving images that have already been taken) stored in the data storage unit 100. Moreover, when the image data is stored in a computer or information storage medium other than the image processing apparatus 10, the taken image acquisition unit 101 may acquire the image data from the computer or information storage medium.

Moreover, it is not particularly required that a frame rate be set in the image taking unit 18, and when images are taken irregularly, the taken image acquisition unit 101 may acquire a taken image G1 every time the image taking unit 18 takes an image. For example, the user may give an instruction to take an image manually from the operation unit 14. In this case, the image taking unit 18 may generate a taken image G1 every time the user gives the instruction to take an image, and the taken image acquisition unit 101 may acquire the taken image G1 generated every time the user gives the instruction to take an image.

[3-3. Observation Space Information Acquisition Unit]

The observation space information acquisition unit 102 is implemented mainly by the control unit 11. The observation space information acquisition unit 102 acquires, based on changes in position of the feature point cloud P in the taken images G1, observation space information including the three-dimensional coordinates of the feature point cloud P in the observation space OS.

The changes in position of the feature point cloud P are changes in position on images, and are changes in two-dimensional coordinates. The changes in position of the feature point cloud P are expressed by vector information (two-dimensional vector information) in the screen coordinate system. In other words, the observation space information acquisition unit 102 acquires, for each individual feature point included in the feature point cloud P, vector information indicating a change in position of the feature point.

The observation space information acquired by the observation space information acquisition unit 102 is information indicating a distribution of the feature point cloud P in the observation space OS, and is a so-called 3D map of the feature point cloud P. As described above with reference to FIG. 4, the observation space information at this stage stores only the three-dimensional coordinates of the feature point cloud P, and is the sparse point cloud data that cannot express a surface shape of the photographed object.

The observation space information acquisition unit 102 extracts the feature point cloud P from the taken images G1, and tracks the extracted feature point cloud P. A feature point may be any point indicating a feature of the photographed object of which the taken images G1 are taken, and may be a point indicating a part of the contour of the photographed object, or a point (for example, center point) inside the photographed object, for example. The method of extracting the feature point itself may be executed based on a known feature point extraction algorithm. For example, a point on the contour of the photographed object detected by contour extraction processing may be set as a feature point, a point at which contour lines cross at a predetermined angle or more may be set as a feature point, or an edge portion in an image may be set as a feature point.

Alternatively, the observation space information acquisition unit 102 may extract a feature point based on an algorithm called "scale-invariant feature transform" (SIFT: https//en.wikipedia.org/wiki/Scale-invariant_feature_transform), or may extract a feature point based on an algorithm called "oriented FAST and rotated BRIEF" (ORB: http://www.willowgarage.com/sites/default/files/orb_final.pdf), for example. According to those algorithms, a portion other than a corner of an edge of the photographed object may be extracted as a feature point.

A relationship between the changes in position of the feature point cloud P and the three-dimensional coordinates is stored in advance in the data storage unit 100 in a form of a mathematical expression, a tabular form, or apart of program code. The changes in position of the feature point cloud P is two-dimensional information, and hence the relationship may also be regarded as a transformation rule for transforming the two-dimensional information to three-dimensional information. The observation space information acquisition unit 102 acquires the three-dimensional coordinates associated with the changes in position of the feature point cloud P.

In this embodiment, the observation space information acquisition unit 102 acquires the observation space information with the use of the SLAM technology. A feature point moves in a direction opposite to a direction in which the image taking unit 18 has moved on the images with respect to the photographed object in the real space RS. Further, an amount of movement of the feature point on the image becomes smaller as the photographed object is located further away. In the SLAM technology, the three-dimensional coordinates of the feature point cloud P are calculated based on those tendencies with the use of the principle of triangulation. In other words, the observation space information acquisition unit 102 tracks the feature point cloud P, and calculates the three-dimensional coordinates of the feature point cloud P based on the SLAM technology using the principle of triangulation.

The observation space information acquisition unit 102 also estimates the position of the image taking unit 18 based on the changes in position of the feature point cloud P, and sets the observation viewpoint OV in the observation space OS based on a result of the estimation. For example, the observation space information acquisition unit 102 estimates the current position and orientation of the image taking unit 18, and reflects a result of the estimation on the position and the orientation of the observation viewpoint OV.

A relationship between the changes in position of the feature point cloud P and the position and the orientation of the image taking unit 18 is stored in advance in the data storage unit 100 in a form of a mathematical expression, a tabular form, or a part of program code. It can also be regarded that this relationship shows a relationship between the two-dimensional vector information indicating the changes of the feature point cloud P, and the three-dimensional coordinates indicating the position and three-dimensional vector information indicating the orientation of the observation viewpoint OV. The observation space information acquisition unit 102 acquires the three-dimensional coordinates and the three-dimensional vector information associated with the changes in position of the feature point cloud P.

With the observation space information acquisition unit 102 setting the observation viewpoint OV, when the image taking unit 18 moves in the real space RS, the observation viewpoint OV moves in the observation space OS as with the image taking unit 18. In other words, the position and the orientation of the observation viewpoint OV in the observation space OS change as with the position and the orientation of the image taking unit 18 in the real space RS. As the method of estimating the position and the orientation of the image taking unit 18 itself, a known viewpoint estimation method can be applied, and the SLAM technology may be used, for example.

[3-4. Machine Learning Unit]

The machine learning unit 103 is implemented mainly by the control unit 11. The machine learning unit 103 acquires, based on the machine learning data on the feature of the object, additional information on the feature of the photographed object shown in the taken images G1.

The additional information indicates a feature in appearance of the photographed object, and may be the three-dimensional shape, a classification (type), the color, the pattern, or other such information of the photographed object, for example. In this embodiment, as an example of the additional information, information on the three-dimensional shape of the photographed object, which is estimated based on the machine learning data, is described. The information on the three-dimensional shape of the photographed object may be any information with which the irregularities on the surface or the orientation of the photographed object can be three-dimensionally identified, and is information on the mesh of the photographed object, or information on the normal of the photographed object, for example. Stated differently, the information on the three-dimensional shape of the photographed object is surface information indicating the surface of the photographed object.

The information on the mesh of the photographed object may be any information with which the mesh can be expressed in the observation space OS, and may be dense point cloud data, the coordinates of the vertices forming the mesh themselves, or a depth with which the coordinates of the vertices can be identified, for example. The term "dense" as used herein means having a density of a level with which the surface shape of the photographed object can be expressed (density of a certain value or more), and having a density that is equivalent to that of vertices of a general mesh in a computer graphic technology, for example. The depth is a depth of the mesh as seen from the observation viewpoint OV, and is a distance between the observation viewpoint OV and each vertex of the mesh. Meanwhile, the information on the normal of the photographed object may be any information with which a normal to the surface of the photographed object can be identified, and may be the vector information of the normal, or an angle at which a predetermined plane (for example, Xw-Yw plane) in the observation space OS and the normal cross each other, for example.

The additional information may have any data format, and in this embodiment, a description is given of a case in which the additional information is two-dimensional feature amount information in which the position of the photographed object in the taken image G1 (two-dimensional coordinates in the screen coordinate system) and a feature amount relating to the photographed object are associated with each other. Further, as an example of the two-dimensional feature amount information, a description is given of a feature amount image in which the feature amount relating to the photographed object is associated with each pixel. The feature amount of each pixel in the feature amount image is a numerical value representing a feature of the pixel, and is the depth of the photographed object estimated based on the machine learning data, for example. In other words, the depth image G2 is an example of the feature amount image. The feature amount is not limited to the depth. For example, the feature amount of the feature amount image may be the normal of the photographed object estimated based on the machine learning data. In other words, the normal image G3 is also an example of the feature amount image.

The machine learning unit 103 identifies an object similar to the photographed object from among the objects represented in the machine learning data. The term "similar" means being similar in appearance, and may mean being similar in shape or being similar both in shape and in color, for example. The machine learning unit 103 calculates a degree of similarity between the object represented in the machine learning data and the photographed object, and determines, when the degree of similarity is a threshold value or more, that the object and the photographed object are similar to each other. The degree of similarity may be calculated based on a difference in shape or a difference in color.

With the object and the feature information being associated with each other in the machine learning data, the machine learning unit 103 acquires the additional information based on the feature information associated with the object similar to the photographed object. For example, when identifying a plurality of similar objects from the taken image G1, the machine learning unit 103 acquires additional information containing a plurality of sets of feature information corresponding to the plurality of objects, respectively.

For example, the machine learning unit 103 identifies an object similar to the photographed object from among the objects represented in the depth learning data. Then, the machine learning unit 103 sets pixel values indicating depths associated with the identified object to pixels of the photographed object in the taken image G1 to generate the depth image G2. In other words, the machine learning unit 103 sets, for each region in which the photographed object appears in the taken image G1, the depths associated with the object similar to the photographed object.

For example, the machine learning unit 103 identifies an object similar to the photographed object from among the objects represented in the normal learning data. Then, the machine learning unit 103 sets pixel values indicating vector information of a normal associated with the identified object to pixels of the photographed object in the taken image G1 to generate the normal image G3. In other words, the machine learning unit 103 sets, for each region in which the photographed object appears in the taken image G1, the vector information associated with the object similar to the photographed object.

The observation space information acquisition unit 102 and the machine learning unit 103 may execute processing based on the taken images G1 that have been taken in different frames, but in this embodiment, a description is given of a case in which processing is executed based on a taken image G1 that has been taken in the same frame. In other words, a taken image G1 to be referenced by the observation space information acquisition unit 102 to acquire the observation space information, and a taken image G1 to be referenced by the machine learning unit 103 to acquire the additional information are the same, and are taken from the same viewpoint (position and orientation of the image taking unit 18).

[3-5. Integration Unit]

The integration unit 104 is implemented mainly by the control unit 11. The integration unit 104 integrates the observation space information and the additional information. The term "integration" means increasing the amount of information of the observation space OS based on the observation space information and the additional information. For example, increasing the number of point clouds as compared to the observation space OS representing the three-dimensional coordinates of the feature point cloud P, adding, to the three-dimensional coordinates of the feature point cloud P, information (for example, normal information) other than the three-dimensional coordinates, or combining the increasing and the adding to add information while increasing the number of point clouds corresponds to the integration.

The integration unit 104 may generate new information based on the observation space information and the additional information, or may add the additional information to the observation space information instead of generating the new information. For example, the integration unit 104 may increase the number of point clouds indicated by the observation space information to form dense point cloud data, add the normal information or other such information to the three-dimensional coordinates of the feature point cloud P indicated by observation space information, or combine the increasing and the adding to add the normal information or other such information while changing the observation space information into the dense point cloud data. In this embodiment, the additional information indicates the three-dimensional shape of the photographed object, and hence a description is given of a case in which the integration unit 104 adds information on the three-dimensional shape based on the additional information to the observation space information (sparse point cloud data) indicating the three-dimensional coordinates of the feature point cloud P.

Moreover, in this embodiment, the two-dimensional feature amount information is used as the additional information, and hence the integration unit 104 executes processing based on a result of comparison between two-dimensional observation information indicating a view of the observation space OS as seen from the observation viewpoint OV and the two-dimensional feature amount information. The two-dimensional observation information is information obtained by projecting the observation space OS, which is a three-dimensional space, on a two-dimensional space, and is information obtained by two-dimensionally transforming information expressed three-dimensionally. For example, in the two-dimensional observation information, the position (two-dimensional coordinates) of the feature point cloud in the two-dimensional space and the depth of the feature point cloud in the observation space OS are associated with each other. The two-dimensional coordinates of the feature point cloud may be expressed in real values. In other words, it is not required that the two-dimensional coordinates of the feature point cloud be expressed only in integers, but the two-dimensional coordinates may be expressed in a numerical value including decimal numbers.

Further, in this embodiment, the feature amount images (for example, the depth image G2 and the normal image G3) are used as the two-dimensional feature amount information, and hence a description is given of a case in which the integration unit 104 executes processing based on a result of comparison between an observation space image showing a view of the observation space OS as seen from the observation viewpoint OV and the feature amount image, for example. In other words, the observation space information being three-dimensional information and the feature amount image being two-dimensional information are different in dimension, and hence the integration unit 104 executes the processing after matching the dimensions. Instead of transforming the observation space information into two-dimensional information, the integration unit 104 may execute the processing after projecting the feature amount image on the observation space OS to transform the feature amount image into three-dimensional information as in the modification examples to be described later.

Figure 9:
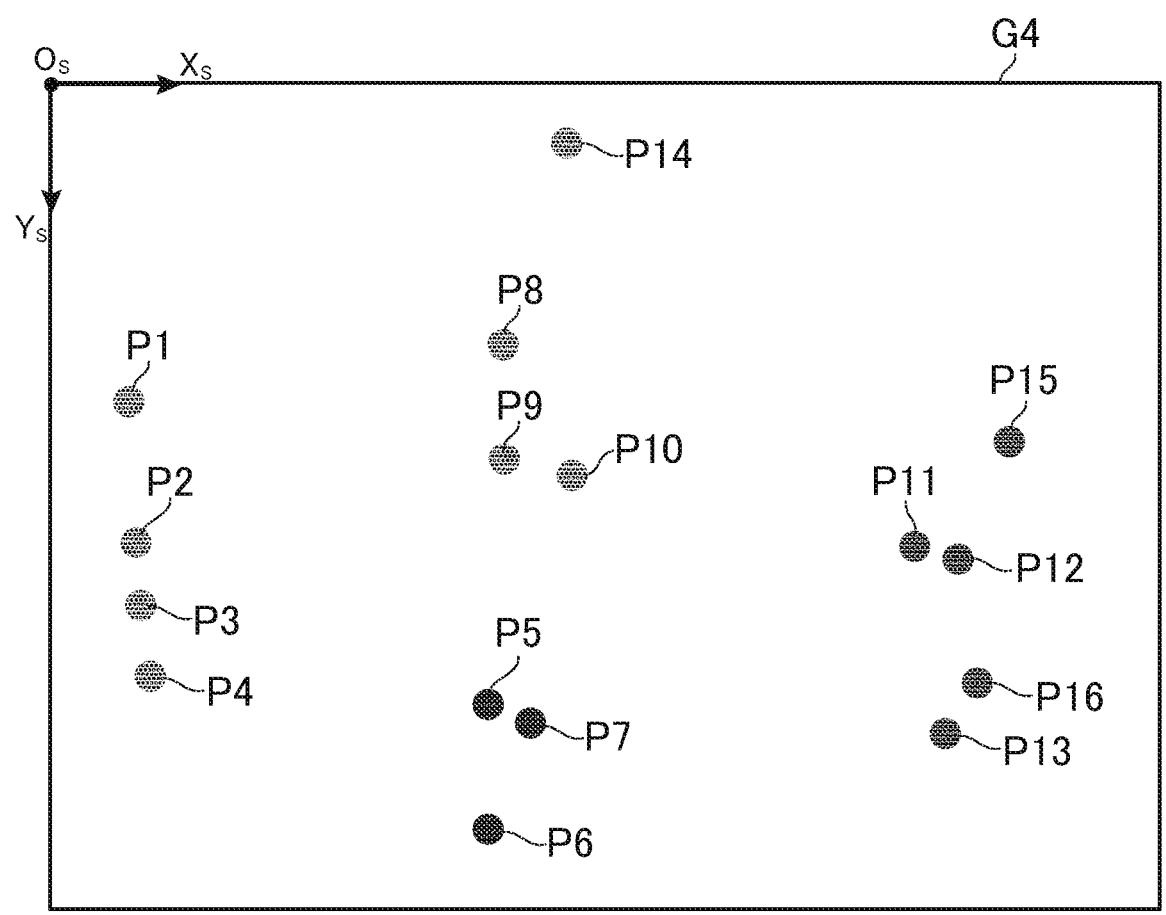
FIG. 9 is a diagram for illustrating an example of an observation space image.

FIG. 9 is a diagram for illustrating an example of the observation space image. In FIG. 9, a view of the observation space OS in the state of FIG. 4 as seen from the observation viewpoint OV is illustrated, and the feature point cloud P appearing in an observation space image G4 is schematically illustrated as circles of a certain size, but in reality, an individual feature point may be expressed by only one or several pixels. Moreover, as described above, instead of being expressed in integer values indicating the position of the pixel, the position of the feature point may be expressed in a float value that can express places after the decimal point.

The integration unit 104 transforms the three-dimensional coordinates of the feature point cloud P into the two-dimensional coordinates in the screen coordinate system to generate the observation space image G4. Therefore, the observation space image G4 may be regarded as a 2D projection view obtained by projecting the observation space OS, which is three-dimensional information, on two-dimensional information. As this transformation processing itself, known coordinate transformation processing (geometry processing) can be applied. For example, the observation space image G4 indicates depths of the feature point cloud P in the observation space OS. In other words, pixel values of the observation space image G4 indicate depths as in the depth image G2. For a portion of the observation space image G4 in which the feature point cloud P does not appear, pixel values may not particularly be set, or a predetermined value indicating that the feature point cloud P does not appear may be set.

The observation space image G4 has the same size (the same number of pixels longitudinally and laterally) as that of the taken image G1, and may be a color image or a grayscale image. In the example of FIG. 9, a pixel value of the observation space image G4 is schematically illustrated as a darkness of a dot, with a darker dot indicating a shallower depth (shorter distance), and a lighter dot indicating a deeper depth (longer distance). For example, dots of pixels indicating the feature points P5 to P7, which are close to the observation viewpoint OV, are dark, dots of pixels indicating the feature points P11 to P15, which are not very far from the observation viewpoint OV, have an intermediate level of darkness, and dots of the feature points P1 to P4, P8 to P10, and P14, which are far from the observation viewpoint OV, are light.

The integration unit 104 identifies pixels in which the feature point cloud P appear in the observation space image G4, and executes the processing based on pixel values of the pixels in the feature amount images (for example, the depth image G2 and the normal image G3). In the example of FIG. 9, the integration unit 104 identifies two-dimensional coordinates of pixels in which the feature points P1 to P15 appear in the observation space image G4, and executes the processing based on pixel values of the pixels at the two-dimensional coordinates of the feature amount image.

Figure 10:
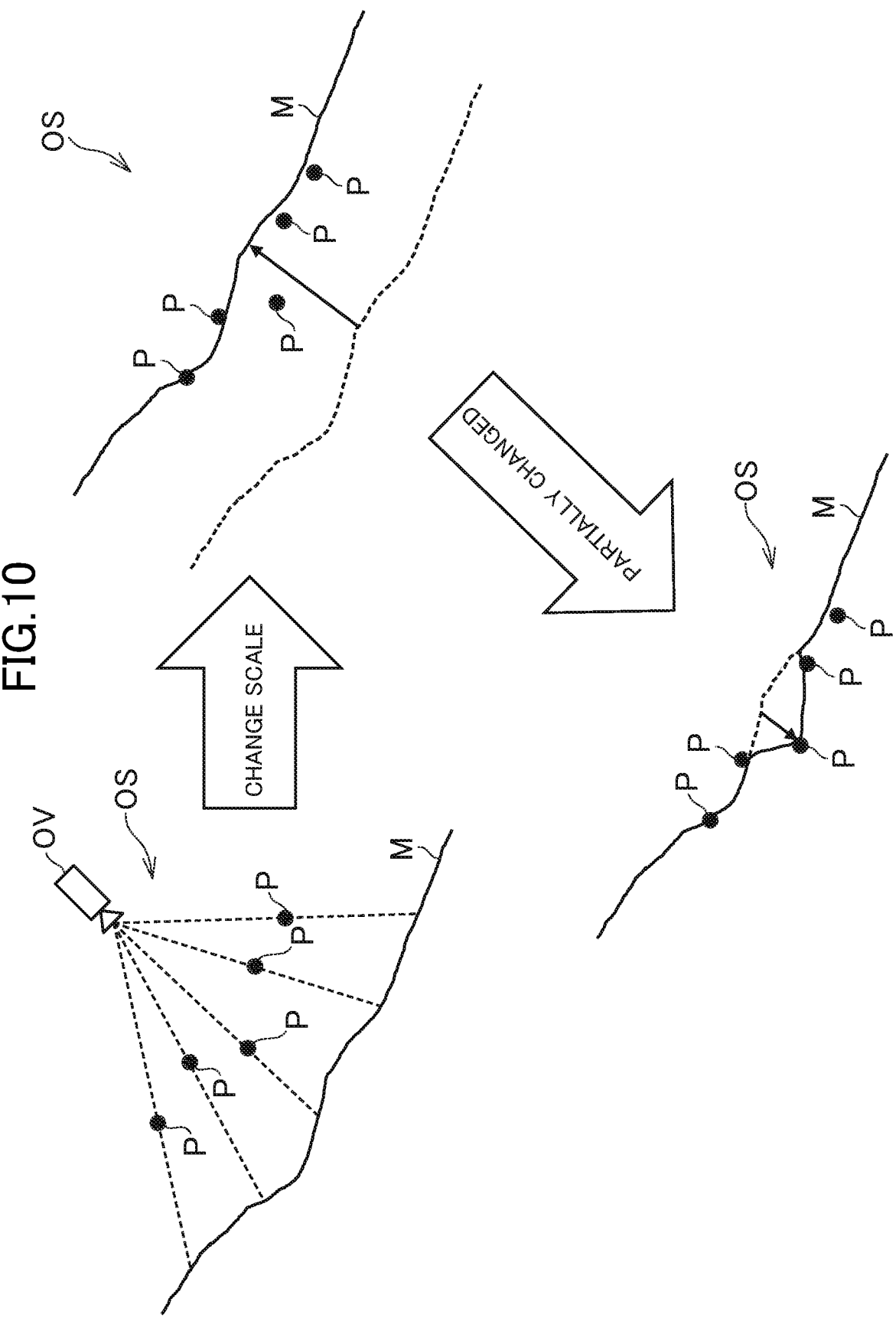
FIG. 10 is a diagram for illustrating an example of processing to be executed by an integration unit.

FIG. 10 is a diagram for illustrating an example of the processing to be executed by the integration unit 104. As illustrated in FIG. 10, the integration unit 104 first sets a mesh M in the observation space OS based on the depth image G2. For example, the integration unit 104 projects a depth of each pixel shown in the depth image G2 on the observation space OS, and sets a provisional mesh M (mesh M as initial values) so that a location that is separated from the observation viewpoint OV by the depth has the coordinates of the vertices. In other words, the integration unit 104 transforms the depth of each pixel of the depth image G2 into three-dimensional coordinates, and sets the three-dimensional coordinates as the coordinates of the vertices of the mesh M.

As the method itself of setting and transforming the point clouds in the three-dimensional space into the mesh based on the depth information, various known methods can be applied. Stated differently, as the method itself of transforming the depth information, which is so-called 2.5-dimensional information, into three-dimensional point cloud data, various known methods can be applied. For example, the mesh M may be set in the observation space OS with the use of a method described in "On Fast Surface Reconstruction Methods for Large and Noisy Point Clouds" (http://ias.in-formatik.tu-muenchen.de/_media/spezial/bib/marton09icra.pdf).

As illustrated in FIG. 10, the mesh M set based on the depth image G2 does not have a scale, and hence it is not always the case that the feature point cloud P, which is the actually measured values, and the mesh M match in position. Therefore, the integration unit 104 changes a scale of the mesh M based on a result of comparison between the observation space image G4 and the depth image G2. In other words, the integration unit 104 identifies a portion of the mesh M that corresponds to the feature point cloud P, and changes the scale of the mesh M such that the identified portion is brought closer to the feature point cloud P.

The scale is a parameter that affects a position and a size of the mesh M, and when the scale is changed, an interval of the point cloud forming the mesh M is changed, or a distance between the mesh M and the observation viewpoint OV is changed. For example, when the scale is increased, the interval of the point cloud becomes wider as a whole to increase the size of the mesh M, or the distance between the mesh M and the observation viewpoint OV becomes longer. Moreover, for example, when the scale is reduced, the interval of the point cloud becomes narrower as a whole to reduce the size of the mesh M, or the distance between the mesh M and the observation viewpoint OV becomes shorter.

For example, the integration unit 104 calculates the scale such that an index value indicating a degree of displacement between the feature point cloud P and the mesh M becomes smaller than a threshold value. This index value is calculated based on distances between the feature point cloud P and the mesh M. For example, the index value may be calculated by a mathematical expression with a distance between each feature point and the mesh M being an argument, and may be a total value of the distances between the feature point cloud P and the mesh M or an average value of the distances, for example.

For example, the integration unit 104 calculates the index value while changing the scale, and determines whether the index value is less than the threshold value. When the index value is the threshold value or more, the integration unit 104 changes the scale again to perform the determination processing again. In contrast, when the index value is less than the threshold value, the integration unit 104 decides on the current scale. Through the decision on the scale, the integration unit 104 changes the mesh M such that an overall degree of displacement between the feature point cloud P and the mesh M becomes smaller.

Moreover, as illustrated in FIG. 10, after changing the scale to change the mesh M as a whole, the integration unit 104 may partially change the mesh M based on the changed mesh M and the feature point cloud P. For example, the integration unit 104 determines, for each feature point, whether a distance between the feature point and the mesh M is a threshold value or more. When the distance is the threshold value or more, the integration unit 104 changes the mesh M corresponding to the feature point such that the mesh M becomes closer to the feature point. The partial change of the mesh M is executed through changing of three-dimensional coordinates of some vertices (vertices near the feature point as a target).

The processing to be executed by the integration unit 104 is not limited to the example described above. For example, the integration unit 104 may change, after changing the mesh M based on the depth image G2, the mesh M again based on the normal image G3. In this case, the integration unit 104 acquires normal information of the mesh M that has been changed based on the depth image G2, and compares the acquired normal information with normal information indicated by the normal image G3. Then, the integration unit 104 partially changes the mesh M such that a difference therebetween becomes smaller. The integration unit 104 may identify correspondences between the mesh M and the normal information indicated by the normal image G3 by comparing the observation space image G4 and the normal image G3 by processing similar to that for the depth image G2.

As described above, the integration unit 104 in this embodiment sets the mesh M of the photographed object in the observation space OS based on the two-dimensional feature amount information, and changes the scale of the mesh M based on a result of comparison between the two-dimensional observation information and the two-dimensional feature amount information. For example, the integration unit 104 sets the mesh in the observation space OS based on the additional information, and changes the mesh based on the observation space information.

For example, the integration unit 104 changes the scale of the mesh M, and then partially changes the mesh M based on the result of comparison between the two-dimensional observation information and the two-dimensional feature amount information. Moreover, for example, the integration unit 104 sets the mesh M of the photographed object in the observation space OS based on the depth image G2, and changes the scale of the mesh M based on a result of comparison between the observation space image G4 and the depth image G2. Further, the integration unit 104 changes the scale of the mesh M, and then partially changes the mesh M based on a result of comparison between the observation space image and the feature amount images (for example, the depth image G2 and the normal image G3).

The integration unit 104 may change a mesh portion of the mesh M that corresponds to the three-dimensional coordinates of the feature point cloud indicated by the observation space information, and then change a mesh portion around the mesh portion. The term "around" means a portion within a predetermined distance. For example, the integration unit 104 changes the mesh M that has been provisionally set so as to match the three-dimensional coordinates of the feature point cloud, and then changes a mesh portion between each pair of the feature points so that the mesh portion becomes smoother. The term "smooth" means, for example, that a change in irregularities is not too abrupt, and that a change in position becomes less than a threshold value. For example, the integration unit 104 changes the mesh portion such that the change in irregularities of the mesh M becomes less than a threshold value.

As the method itself of changing the mesh portion, a known technology may be used, and a method called "ARAP" described in "As-Rigid-As-Possible Surface Modeling" (http://igl.ethz.ch/projects/ARAP/arap_web.pdf) may be used, for example. Through the change of the mesh portion around the mesh portion that has been matched to the feature point cloud, a contradiction between each mesh portion and its surroundings can be resolved, and a smoother and more natural mesh can be set.

The ARAP method may be used as it is, but in this embodiment, a description is given of a case in which the ARAP method is extended to change the mesh M based on reliability of estimating the mesh.

For example, the mesh M is estimated by machine learning, and hence the mesh M includes a part with high reliability of the mesh estimation and a part with low reliability of the mesh estimation. Therefore, the integration unit 104 may allow the part with low reliability to be changed in shape to a certain degree while not changing the part with high reliability a lot to maintain its shape. The term "reliability" is a degree of accuracy of estimating the shape, and is a degree of similarity with a surface shape of the subject.

For example, when the subject is directed to the image taking unit 18, the surface is clearly caught in the taken image G1, and hence the accuracy of estimating the mesh M is often high. Meanwhile, when the subject is directed sideways with respect to the image taking unit 18, the surface is not caught very well in the taken image G1, and hence the accuracy of estimating the mesh M may be low in some cases. Therefore, in this embodiment, a part of the mesh M that is directed to the observation viewpoint OV has high reliability, and a part that is not directed to the observation viewpoint OV (part that is directed sideways with respect to the observation viewpoint OV) has low reliability.

Figure 11:
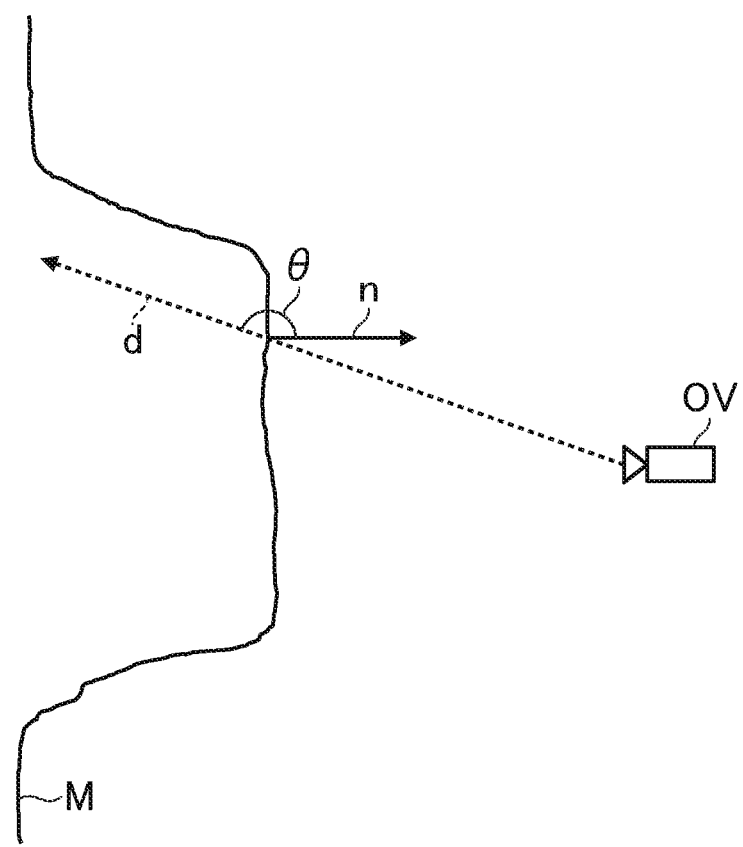
FIG. 11 is an explanatory diagram of processing of changing a mesh by extending an ARAP method.
Figure 12:
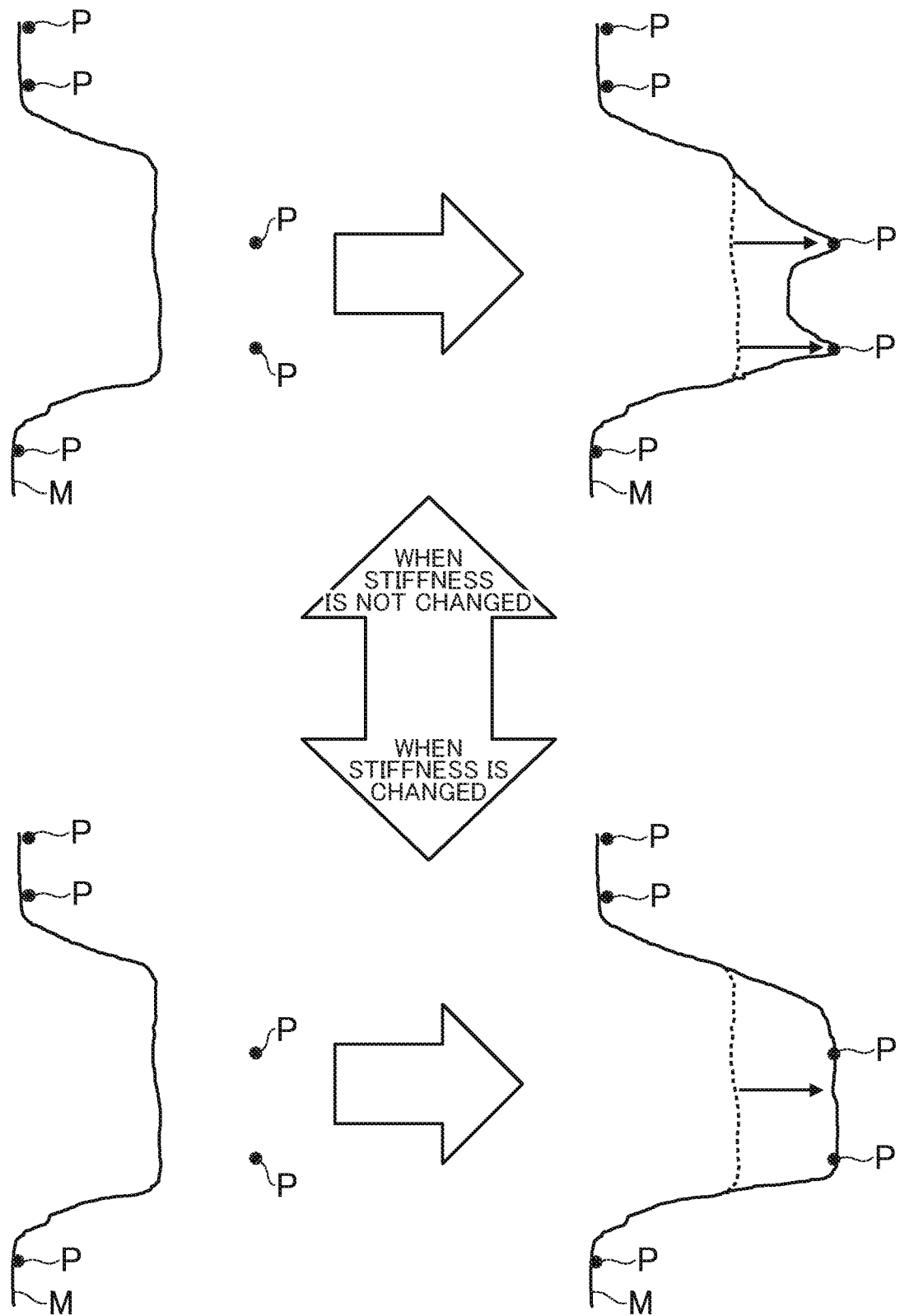
FIG. 12 is an explanatory diagram of the processing of changing the mesh by extending the ARAP method.

FIG. 11 and FIG. 12 are explanatory diagrams of processing of extending the ARAP method to change the mesh M. As illustrated in FIG. 11, in this embodiment, as an angle θ formed by a normal vector n of a vertex of the mesh M and a vector d connecting the observation viewpoint OV and the vertex becomes closer to 180°, the reliability becomes higher, and as the angle θ becomes closer to 90°, the reliability becomes lower. In this embodiment, it is assumed that the mesh M is not directed to a direction opposite to the observation viewpoint OV, and that the angle θ does not become less than 90° in principle.

For example, the integration unit 104 changes a mesh portion based on an orientation (angle θ) of the mesh portion with respect to the observation viewpoint OV. In other words, the integration unit 104 determines an amount of change of the mesh portion based on the orientation of the mesh portion with respect to the observation viewpoint OV. The term "amount of change of the mesh portion" is how much the shape is deformed, and an amount of change in three-dimensional coordinates (amount of movement) of the vertex.

It is assumed that a relationship between the orientation with respect to the observation viewpoint OV and the amount of change of the mesh portion is stored in advance in the data storage unit 100. The relationship may be stored as data in a form of a mathematical expression or a tabular form, or may be described as a part of program code. The integration unit 104 changes an orientation of each mesh portion of the mesh M based on the amount of change associated with the orientation of the mesh portion with respect to the observation viewpoint OV.

For example, the integration unit 104 sets the amount of change of the mesh portion to be smaller as the mesh portion is more directed to the observation viewpoint OV (as the angle θ becomes closer to 180°), and sets the amount of change of the mesh portion to be larger as the mesh portion is less directed to the observation viewpoint OV (as the angle θ becomes closer to 90°). Stated differently, the integration unit 104 sets stiffness of the mesh portion to be higher as the mesh portion is more directed to the observation viewpoint OV, and sets the stiffness of the mesh portion to be lower as the mesh portion is less directed to the observation viewpoint OV. The phrase "the mesh portion is not directed to the observation viewpoint OV" means that the mesh portion is directed sideways with respect to the observation viewpoint OV.

If the stiffness is not changed depending on the reliability of each part of the mesh M as described above, the mesh M may be deformed unnaturally as if to be pulled by the feature points P in some cases as illustrated in FIG. 12. In this regard, the above-mentioned unnatural deformation can be prevented to obtain a more natural mesh M by deforming while maintaining the stiffness of the part with high reliability (parts directed to the observation viewpoint OV) to maintain the shape of the part with high reliability.

In the following description, a vertex of the mesh M that corresponds to a feature point P is represented by $v_i$. For example, the vertex $v_i$ is a vertex that is closest to a point of intersection of a straight line (dotted line of the vector d of FIG. 11) connecting the observation viewpoint OV and the feature points P with the mesh M. For example, the integration unit 104 may change the mesh M based on Equations 1 to 7 provided below. For example, Equations 1 to 7 (in particular, Equations 3 and 4) are an example of the relationship between the orientation with respect to the observation viewpoint OV and the amount of change of the mesh portion described above.

The integration unit 104 first calculates a value of an energy function expressed by the left side of Equation 1 below for each vertex $v_i$.

$$E(C_i') = \sum_{v_j \in N(v_i)} \omega_{ij} \|(v_i' - v_j') - R_i(v_i - v_j)\|^2 \quad \text{[Equation 1]}$$

In Equation 1, neighborhood corresponding to the vertex $v_i$ is represented by $C_i$, and each vertex of the neighborhood is represented by $v_1$. The term "neighborhood" is vertices around the vertex $v_i$, and is adjacent vertices (one-ring neighborhood) in this example, but vertices apart by two or more vertices may correspond to the neighborhood. Moreover, the vertex after the change is represented by $v'_i$, the neighborhood after the change is represented by $C'_i$, and the adjacent vertex after the change is represented by $v'_j$.

$N(v_i)$ on the right side of Equation 1 is a collection of adjacent vertices $v_j$ included in the neighborhood $C_i$ of the vertex $v_i$. $R_i$ on the right side of Equation 1 is a 3×3 rotation matrix. As indicated by Equation 1, the energy function E ($C'_i$) is a total value of values obtained by multiplying changes in relative position of the adjacent vertex $v_j$ with respect to the vertex $v_i$ by a weighting factor Even if the adjacent vertex $v_j$ is moved by a large amount with respect to the vertex $v_i$, the value of the energy function $E(C'_i)$ is small when the weighting factor is small. In contrast, even if the adjacent vertex v is not moved a lot with respect to the vertex $v_i$, the value of the energy function $E(C'_i)$ is large when the weighting factor $\omega_{ij}$ is large.

A value of the weighting factor $\omega_{ij}$ is determined by a combination of the vertex $v_i$ and the adjacent vertex $v_j$. For example, the integration unit 104 calculates the weighting factor based on Equation 2 below. In Equation 2, $\alpha_{ij}$ and $\beta_{ij}$ on the right side are angles on the side opposite to an edge (i, j) of the mesh M.

$$\omega_{ij} = \tfrac{1}{2}(\cot \alpha_{ij} + \cot \beta_{ij}) \qquad \text{[Equation 2]}$$

For example, the integration unit 104 calculates a total value of the energy functions $E(C'_i)$ calculated for each vertex $v_i$ based on Equation 3 below.

$$E(M') = \sum_{v_i \in M} \omega_i E(C'_i) \qquad \text{[Equation 3]}$$

In Equation 3, the mesh M after the change is represented by M'. As shown in the right side of Equation 3, the integration unit 104 calculates a value obtained by multiplying the value of the energy function $E(C'_i)$ by a weighting factor $\omega_i$ for each vertex $v_i$, and calculates a total value of the values. The weighting factor $\omega_i$ may be determined with the use of a sigmoid function, for example. For example, the integration unit 104 calculates the weighting factor $\omega_i$ based on Equation 4 below.

$$\omega_i = \frac{1}{1 + e^{-a(\theta + b\pi)}} \qquad \text{[Equation 4]}$$

In Equation 4, "a" and "b" on the right side are coefficients, and are fixed values. For example, as the angle θ becomes closer to 180°, the weighting factor $\omega_i$ becomes larger, and the effect of the change of the mesh portion on the total value of energy functions (left side of Equation 3) becomes more significant. Therefore, even a small change of the mesh portion increases the total value of energy functions significantly. In contrast, as the angle θ becomes closer to 90°, the weighting factor $\omega_i$ becomes smaller, and the effect of the change of the mesh portion on the total value of energy functions becomes less significant. Therefore, even a large change of the mesh portion does not increase the total value of energy functions a lot. Through setting of the weighting factor $\omega_i$ as described above, the stiffness can be changed depending on the reliability of the mesh M.

The integration unit 104 may change the mesh M such that the total value of energy functions $E(C'_i)$ calculated by Equation 3 becomes smaller, but the integration unit 104 may further take a bending modulus into consideration. The bending modulus is a numerical value indicating how much the surface of the mesh M has been bent (deformed), and is calculated based on Equation 5 below as described in, for example, "Z. Levi and C. Gotsman. Smooth rotation enhanced as-rigid-as-possible mesh animation. IEEE Transactions on Visualization and Computer Graphics, 21: 264-277, 2015".

$$B_{ij} = \alpha A \|R_i - R_j\| \qquad \text{[Equation 5]}$$

In Equation 5, "α" on the right side is a weighting factor, and "A" means a surface having features that are not changed even when the scale is changed. In Equation 1, $R_i$ and $R_j$ on the right side are 3×3 rotation matrices. For example, the integration unit 104 may calculate a bending modulus $B_{ij}$ for each combination of the vertex $v_i$ and the adjacent vertex $v_j$, and reflect the bending modulus $B_{ij}$ on the total value of energy functions $E(C'_i)$ based on Equation 6 below.

$$E(M') = \sum_{v_i \in S_i} \omega_i E(C'_i) + B_{ij} \qquad \text{[Equation 6]}$$

The taken images G1 are acquired repeatedly at the predetermined frame rate, and the integration unit 104 repeatedly executes the processing described above. Therefore, the integration unit 104 may calculate an absolute scale $s^w_t$ of the observation space OS at a time t based on Equation 7 below in consideration of the scales that have been previously calculated. In Equation 7, $s^c_t$ on the right side is a scale set to the mesh M.

$$s^w_t = \frac{t}{\sum_t s^c_t} \qquad \text{[Equation 7]}$$

4. Processing to be Executed in this Embodiment

Figure 13:
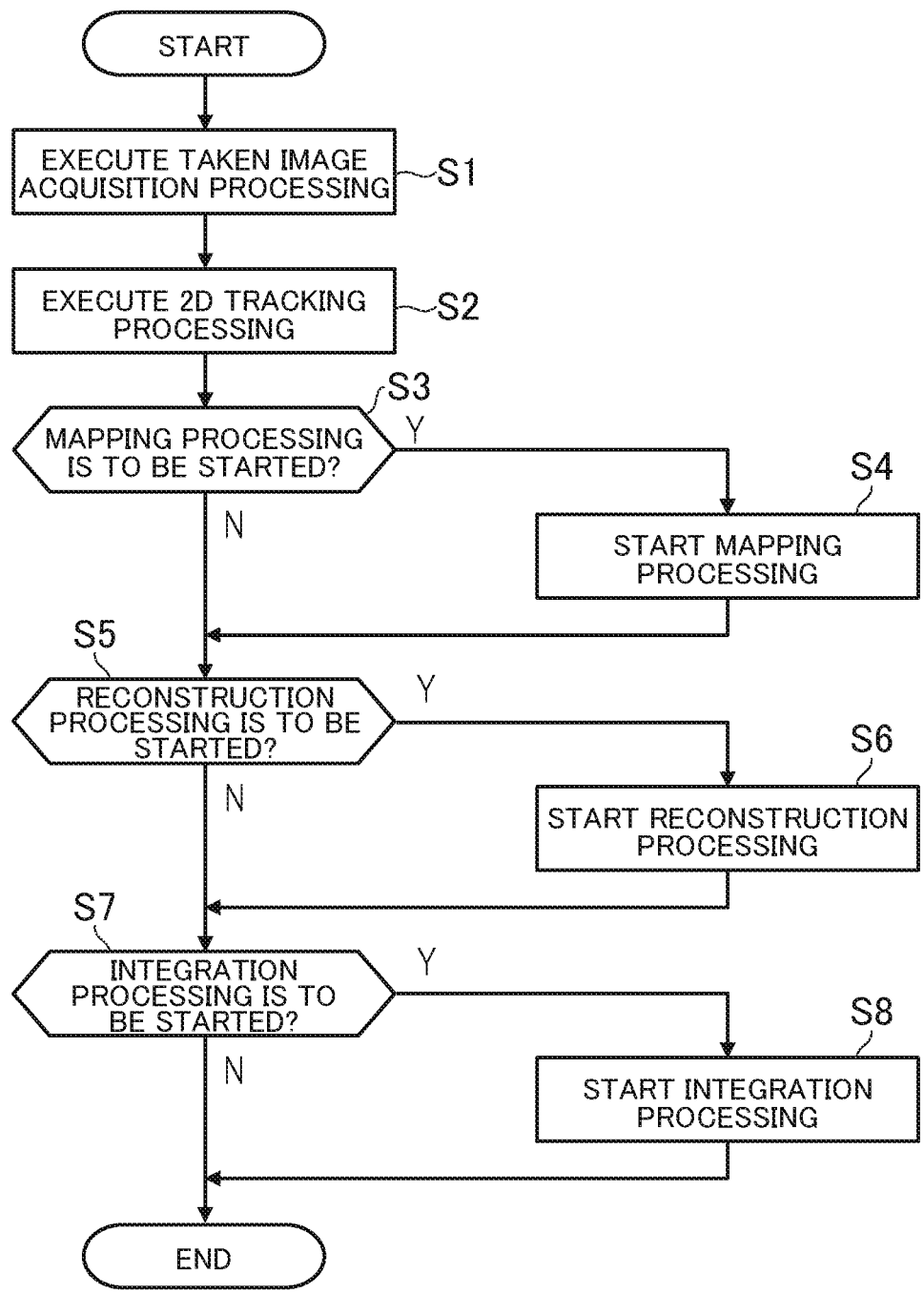
FIG. 13 is a flow chart for illustrating an example of processing to be executed in the image processing apparatus.

FIG. 13 is a flow chart for illustrating an example of processing to be executed in the image processing apparatus 10. The processing illustrated in FIG. 13 is executed by the control unit 11 operating in accordance with programs stored in the storage unit 12. The processing illustrated in FIG. 13 is an example of the processing to be executed by the functional blocks illustrated in FIG. 8, and is executed for each frame taken by the image taking unit 18.

In executing the processing illustrated in FIG. 13, it is assumed that initialization of mapping processing to be described below has been completed, and that the observation space OS (3D map of the feature point cloud P) has been generated. In other words, the control unit 11 has tracked the feature point cloud P extracted from the taken images G1, and has set the three-dimensional coordinates of the feature point cloud P and the observation viewpoint OV in the observation space OS with the use of the SLAM technology.

As illustrated in FIG. 13, the control unit 11 first executes taken image acquisition processing (Step S1). In Step S1, the control unit 11 acquires a taken image G1 generated in the current frame by the image taking unit 18. The control unit 11 may record the taken images G1 in the storage unit 12 in time sequence. In other words, the control unit 11 may record a history of taken images G1 in the storage unit 12.

The control unit 11 executes 2D tracking processing (Step S2) based on the taken image G1 acquired in Step S1. The 2D tracking processing is processing for tracking changes in position of the feature point cloud P on the image. In Step S2, the control unit 11 first acquires the feature point cloud P from the taken image G1 acquired in Step S1. Then, the control unit 11 identifies correspondences between the feature point cloud P and the feature point cloud P in a taken image G1 acquired in the last frame (previous frame) to acquire vector information indicating differences in two-dimensional coordinates of the feature point cloud P. The control unit 11 records, in the storage unit 12, the two-dimensional coordinates of the feature point cloud P extracted in Step S2 in association with the taken image G1. Alternatively, the control unit 11 may record the vector information of the feature point cloud P in time sequence in the storage unit 12.

The control unit 11 determines whether or not to start the mapping processing (Step S3). The mapping processing is processing for updating the observation space information (three-dimensional coordinates of the feature point cloud P). The mapping processing may be executed for each frame, or once for every plurality of frames. When the mapping processing is executed once for every plurality of frames, an execution interval of the mapping processing may be a fixed value or a variable value.

In this example, a description is given of a case in which the mapping processing is started again in a frame subsequent to a frame in which the last mapping processing is finished. Therefore, in Step S3, it is determined whether or not the last mapping processing has been finished. When the last mapping processing has been finished, it is determined that the mapping processing is to be started, and when the last mapping processing is not finished, it is not determined that the mapping processing is to be started.

When it is determined that the mapping processing is to be started (Step S3: Y), the control unit 11 starts the mapping processing based on the taken image G1 acquired in Step S1 (Step S4). The mapping processing started in Step S4 is executed in parallel to (or in the background of) main routine processing illustrated in FIG. 13.

Figure 14:
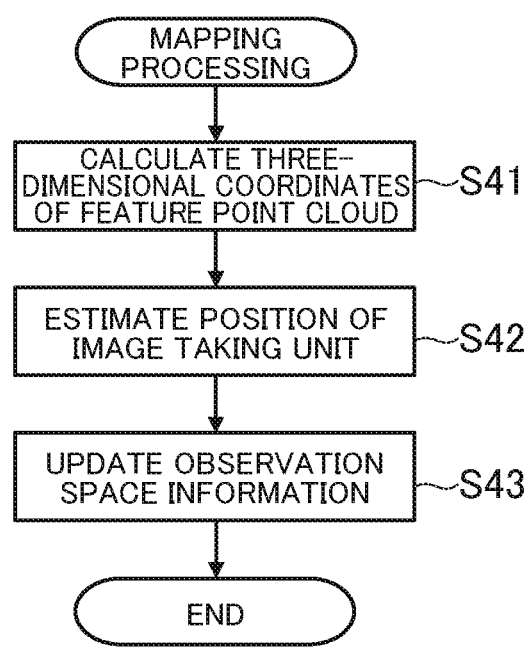
FIG. 14 is a flowchart for illustrating an example of mapping processing.

FIG. 14 is a flow chart for illustrating an example of the mapping processing. As illustrated in FIG. 14, the control unit 11 calculates the three-dimensional coordinates of the feature point cloud P based on an execution result of the 2D tracking processing executed in Step S2 (Step S41). In Step S41, the control unit 11 calculates a cumulative sum of amounts of movement of the feature point cloud P from the last mapping processing, and calculates the three-dimensional coordinates of the feature point cloud P with the use of the SLAM technology.

The control unit 11 estimates the position of the image taking unit 18 based on the execution result of the 2D tracking processing executed in Step S2 (Step S42). In Step S42, the control unit 11 calculates a cumulative sum of amounts of movement of the feature point cloud P from the last mapping processing, and calculates the position and the orientation of the image taking unit 18 with the use of the SLAM technology.

The control unit 11 updates the observation space information based on calculation results of Step S41 and Step S42 (Step S43). In Step S43, the control unit 11 updates, based on the three-dimensional coordinates of the feature point cloud P calculated in Step S41, and the position and the orientation calculated in Step S42, the three-dimensional coordinates of the feature point cloud P and the observation viewpoint parameters.

Returning to FIG. 13, when it is not determined that the mapping processing is to be started (Step S3: N), or when the mapping processing is started in Step S4, the control unit 11 determines whether or not to start reconstruction processing (Step S5). The reconstruction processing is processing of estimating the three-dimensional shape of the photographed object by machine learning, and in this embodiment, is processing of acquiring the depth image G2 and the normal image G3. The reconstruction processing may be executed for each frame, or once for every plurality of frames. When the reconstruction processing is executed once for every plurality of frames, an execution interval of the reconstruction processing may be a fixed value or a variable value.

The reconstruction processing may have computational complexity (load) that is higher than that of the mapping processing in some cases, and in those cases, an execution interval of the reconstruction processing may be set to be longer than that of the mapping processing. For example, the mapping processing may be executed once for every two frames, and the reconstruction processing may be executed once for every three frames.

In this example, a description is given of a case in which the reconstruction processing is started again in a frame subsequent to a frame in which the last reconstruction processing is finished. Therefore, in Step S5, it is determined whether or not the last reconstruction processing has been finished. When the last reconstruction processing has been finished, it is determined that the reconstruction processing is to be started, and when the last reconstruction processing is not finished, it is not determined that the reconstruction processing is to be started.

When it is determined that the reconstruction processing is to be started (Step S5: Y), the control unit 11 starts the reconstruction processing based on the same taken image G1 as that of the mapping processing that is being executed (Step S6). The reconstruction processing started in Step S6 is executed in parallel to (or in the background of) the main routine processing illustrated in FIG. 13.

Figure 15:
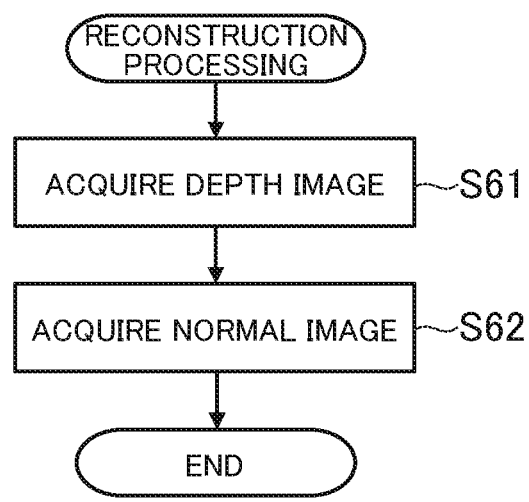
FIG. 15 is a flow chart for illustrating an example of reconstruction processing.

FIG. 15 is a flow chart for illustrating an example of the reconstruction processing. As illustrated in FIG. 15, the control unit 11 acquires the depth image G2 based on the taken image G1 and the depth learning data (Step S61). In Step S61, the control unit 11 identifies a part of the taken image G1 that is similar to the object represented by the depth learning data. Then, the control unit 11 sets a depth of the object represented by the depth learning data as a pixel value of each pixel in the part to generate the depth image G2.

The control unit 11 acquires the normal image G3 based on the taken image G1 and the normal learning data (Step S62). In Step S62, the control unit 11 identifies apart of the taken image G1 that is similar to the object represented by the normal learning data. Then, the control unit 11 sets vector information of a normal of the object represented by the normal learning data as a pixel value of each pixel in the part to generate the normal image G3.

Returning to FIG. 13, when it is not determined that the reconstruction processing is to be started (Step S5: N), or when the reconstruction processing is started in Step S6, the control unit 11 determines whether or not to start integration processing (Step S7). The integration processing is processing of setting the mesh of the photographed object in the observation space OS. The integration processing may be executed for each frame, or once for every plurality of frames. When the integration processing is executed once for every plurality of frames, an execution interval of the integration processing may be a fixed value or a variable value.

A description is given here of a case in which the integration processing is started when both of the mapping processing and the reconstruction processing are complete. Therefore, in Step S7, it is determined whether or not the mapping processing and the reconstruction processing that are being executed are finished. When both of the mapping processing and the reconstruction processing are finished, it is determined that the integration processing is to be started, and when any one of the mapping processing and the reconstruction processing is not finished, it is not determined that the integration processing is to be started.

When it is determined that the integration processing is to be started (Step S7: Y), the control unit 11 starts the integration processing. The integration processing started in Step S8 is executed in parallel to (or in the background of) main routine processing illustrated in FIG. 13.

Figure 16:
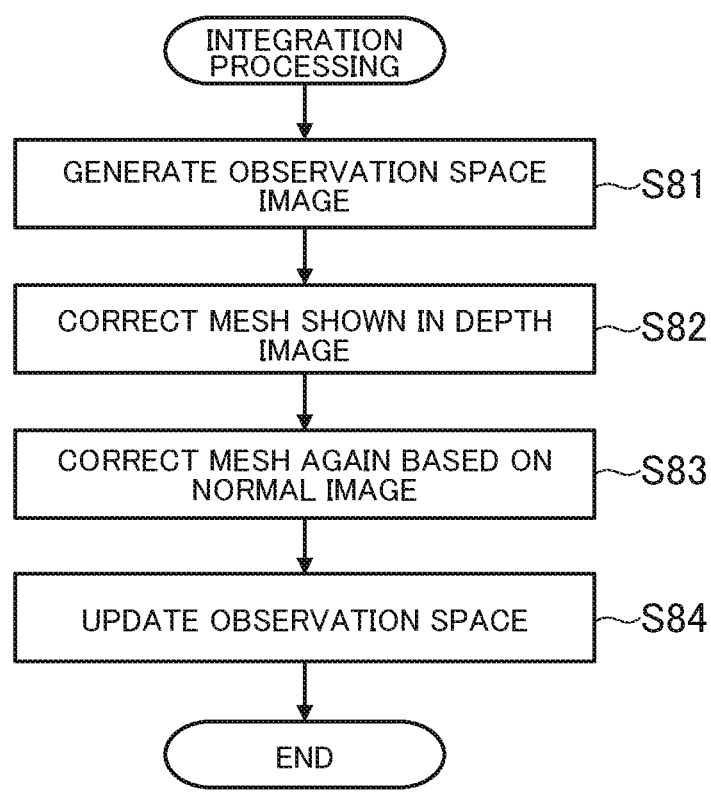
FIG. 16 is a flow chart for illustrating an example of integration processing.

FIG. 16 is a flow chart for illustrating an example of the integration processing. As illustrated in FIG. 16, the control unit 11 generates the observation space image G4 showing a view of the feature point cloud P in the observation space OS as seen from the observation viewpoint OV (Step S81). The observation space image G4 is an image similar to the depth image G2, and each pixel indicates a depth of the feature point cloud P. In Step S81, the control unit 11 calculates a distance between the observation viewpoint OV and the feature point cloud P to generate the observation space image G4.

The control unit 11 corrects the mesh shown in the depth image G2 based on the observation space image G4 generated in Step S81 (Step S82). In Step S82, the control unit 11 identifies a position of the mesh corresponding to the feature point cloud P based on the observation space image G4 and the depth image G2, and corrects the scale of the mesh so that a difference between depths thereof becomes smaller. Further, for a portion in which a distance between the feature points and the mesh is the threshold value or more, the control unit 11 locally corrects the mesh so that the distance becomes smaller than the threshold value. The control unit 11 also performs correction so that the mesh portion around the mesh portion that has been matched to the feature point cloud P becomes smoother. The control unit 11 may further change the mesh portion based on the orientation of the mesh portion with respect to the observation viewpoint OV.

The control unit 11 corrects the mesh that has been corrected in Step S82 again based on the normal image G3 (Step S83). In Step S83, the control unit 11 identifies the normal direction corresponding to the feature point cloud P based on the observation space image G4 and the depth image G2, and corrects the mesh so that a difference between the normal of the mesh corrected in Step S82 (normal in the portion of the mesh that corresponds to the feature point cloud P) and the normal indicated by the normal image G3 becomes smaller.

The control unit 11 updates the observation space OS based on the mesh corrected in Step S83 (Step S84). In Step S84, the control unit 11 stores, in the observation space information, the coordinates of the vertices of the mesh that have been corrected in Step S83. As a result, the observation space information that has been the sparse point cloud data in the mapping processing becomes dense point cloud data by the integration processing.

Returning to FIG. 13, when it is not determined that the integration processing is to be started (Step S7: N), or when the integration processing is started in Step S8, the control unit 11 ends the processing. Subsequently, the processing of FIG. 13 is executed again each time a frame comes.

When augmented reality is provided in real time, before ending the processing, the control unit 11 may arrange a three-dimensional object representing a hypothetical object in the observation space OS, generate a virtual image showing a view of the observation space OS as seen from the observation viewpoint OV, and combine the virtual image with the taken image G1 to be displayed on the display unit 15. The taken image G1 to be combined at that time may be the taken image G1 acquired in Step S1 in the current frame, or may be the taken image G1 referenced in the mapping processing and the reconstruction processing. Further, in the augmented reality, an object representing a moving object, for example, a ball or a vehicle, may be combined. In this case, collision detection between the mesh of the observation space OS and the object representing the moving object may be executed so that the moving object bounces back or climbs up the wall.

Moreover, as described above, it is not required that the mapping processing and the reconstruction processing be executed for every frame, and the mapping processing and the reconstruction processing may be executed once for every plurality of frames. Further, the reconstruction processing may have computational complexity that is higher than that of the mapping processing in some cases, and hence the execution interval of the reconstruction processing may be set to be longer than the execution interval of the mapping processing.

Figure 17:
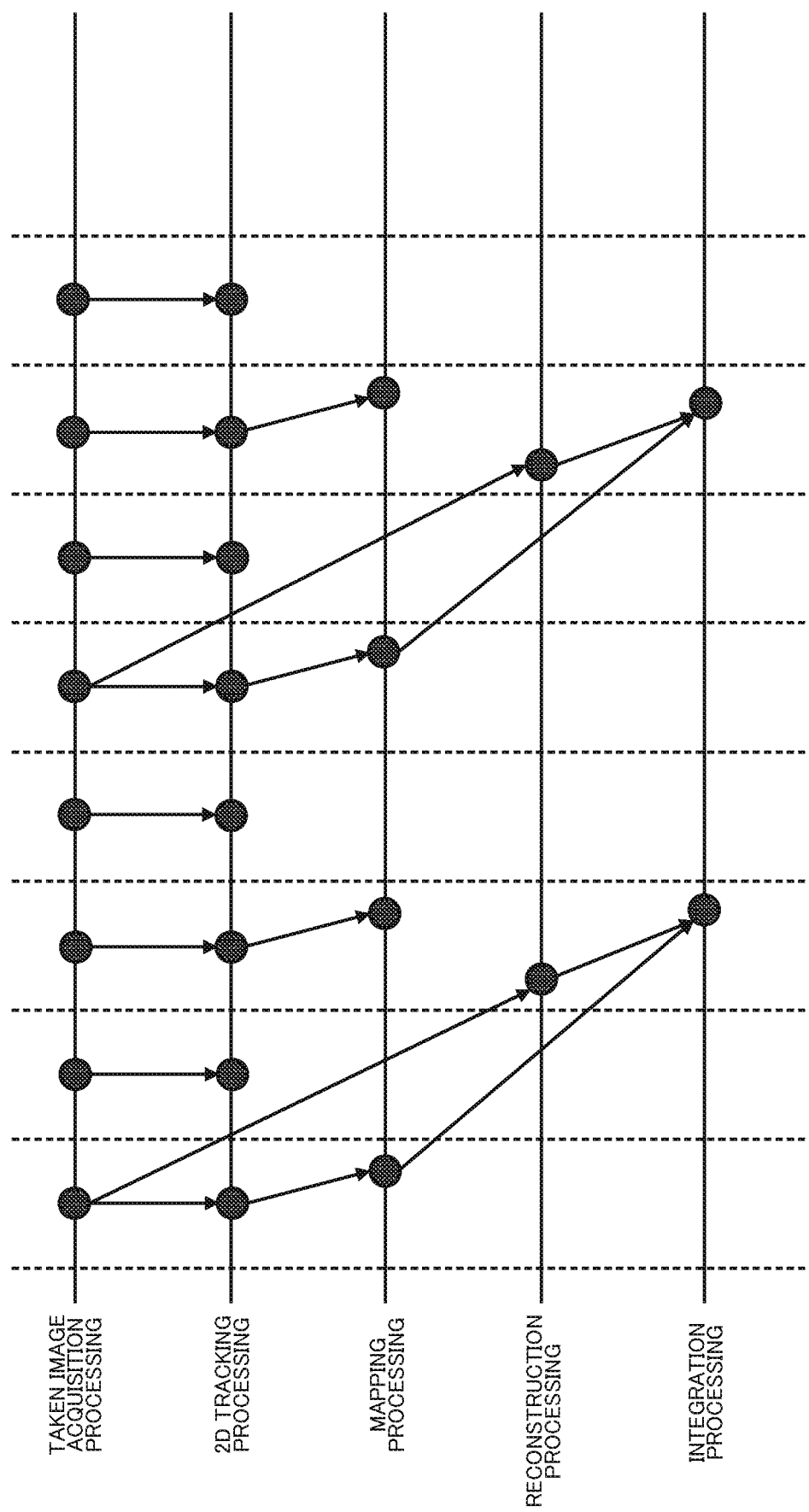
FIG. 17 is a chart for illustrating an example of execution intervals for respective kinds of processing.

FIG. 17 is a chart for illustrating an example of execution intervals of respective kinds of processing. In the example illustrated in FIG. 17, the taken image acquisition processing (Step S1) and the 2D tracking processing (Step S2) are executed for each frame. In contrast, the mapping processing (FIG. 14) is executed once for every n (n is an integer of 2 or more) frames, and the reconstruction processing is executed once for every m (m is an integer of 2 or more, and m>n) frames. The integration processing is executed after the completion of the reconstruction processing. As illustrated in FIG. 17, the taken image G1 to be referenced in the mapping processing and the reconstruction processing is a taken image G1 that is taken in the same frame, and the mapping processing and the reconstruction processing are executed based on the taken image G1 obtained from the same viewpoint.

According to the image processing apparatus 10 described above, the configuration for increasing the amount of information of the observation space OS can be simplified by integrating the taken image G1 that has been taken by the image taking unit 18 and the additional information obtained by machine learning. For example, information other than the three-dimensional coordinates of the feature point cloud P can be added to the observation space OS without the use of a depth camera and other such special sensors. Therefore, even a terminal, for example, a smartphone that does not include a special sensor, can generate the observation space OS with high accuracy.

Moreover, when the feature amount image (for example, the depth image G2 or the normal image G3) is used as the additional information, the image processing apparatus 10 can compare images as seen from the same viewpoint by comparing the observation space image G4 and the feature amount image. In other words, in the related-art technologies, an RGB-D camera, in which two cameras are arranged in parallel, is used, and hence an error is caused in the observation space OS due to a difference in viewpoint position. However, the image processing apparatus 10 uses the same viewpoint to prevent the error from being caused, with the result that the degree of reproduction of the observation space OS can be increased.

Further, the image processing apparatus 10 can bring the mesh obtained by the machine learning closer to the actually measured values as a whole by changing the scale of the mesh based on the result of the comparison between the observation space image G4 and the depth image G2, and hence can increase the degree of reproduction of the observation space OS by simple processing. For example, the mesh is brought closer to the actually measured values as a whole by changing the scale without individually changing the vertices of the mesh one by one, and hence an increase in processing speed can be achieved while achieving simplification of processing (reduction in computational complexity) and reducing a processing load of the image processing apparatus 10.

Still further, the mesh is partially adjusted after the scale of the mesh is changed, and hence the degree of reproduction of the observation space OS can be increased more effectively. Also in this case, through setting a portion with a large difference as the target instead of changing mesh portions individually for all the feature point cloud P, the simplification of the processing for increasing the degree of reproduction of the observation space OS can be achieved, and hence the processing load of the image processing apparatus 10 can be reduced to increase the processing speed more effectively.

Still further, with the use of the three-dimensional shape of the photographed object as the additional information, a three-dimensional shape of the real space RS can be reproduced in the observation space OS, and the configuration for reproducing the three-dimensional shape of the real space RS in detail in the observation space OS can be simplified.

Still further, with the use of the information on the mesh of the photographed object as the additional information, the mesh representing the photographed object can be arranged in the observation space OS, and the configuration for arranging, in the observation space OS, a mesh representing an object in the real space RS can be simplified. Still further, with the observation space OS being based on observation data, and hence being highly accurate though being sparse, and with the additional information being a value predicted with the use of machine learning, and being low in accuracy in some cases, through integration of the feature point cloud of the observation space OS, which is accurate though being sparse, and the mesh of the additional information, which is low in accuracy though being dense, dense data can be acquired while securing accuracy.

Still further, when the information on the mesh of the photographed object is used as the additional information, the degree of reproduction of the observation space OS can be increased effectively by changing the mesh based on the observation space information, which is the actually measured values.

Still further, through a change on the mesh portion corresponding to the three-dimensional coordinates of the feature point cloud, and then changing the mesh portion around the mesh portion, the surface shape of the mesh can be smoothed. In other words, an increase in data accuracy as data for storing the feature points can be achieved, and the degree of reproduction of the observation space OS can be effectively increased.

Still further, through a change on each mesh portion based on the orientation of the mesh portion with respect to the observation viewpoint OV, mesh portions with high reliability can be integrated while maintaining the shape as much as possible, and mesh portions with low reliability can be integrated after changing shapes thereof, with the result that the degree of reproduction of the observation space OS can be effectively increased.

Still further, through the use of the information on the normal of the photographed object as the additional information, the normal can be set in the observation space OS to express the three-dimensional shape of the photographed object, and the configuration for reproducing, in the observation space OS, the orientation of the surface of the object in the real space RS can be simplified.

Still further, through the generation of the observation space information and the additional information based on the taken image G1 in the same frame, the correspondence between images as seen from the same viewpoint can be identified, with the result that the error can be prevented from being caused by the error due to the difference in viewpoint position as described above, and the accuracy of the observation space OS can be increased more effectively.

5. Modification Examples

The present invention is not limited to the embodiment described above, and can be modified suitably without departing from the spirit of the present invention.

(1) For example, in the embodiment, the depth or the normal of the photographed object has been described as an example of the additional information, but the additional information may be information on the classification of the photographed object. In other words, the additional information may be information obtained by grouping each pixel of the taken image G1 into respective photographed objects. In this modification example, as in the embodiment, the case of using the feature amount image is described, and a classification image obtained by classifying each pixel of the taken image G1 is described as an example of the feature amount image.

FIG. 18 is a diagram for illustrating an example of the classification image. As illustrated in FIG. 18, a classification image G5 has the same size (the same number of pixels longitudinally and laterally) as that of the taken image G1, and is an image obtained by grouping a region in the image into respective photographed objects. In the classification image G5, a pixel value is assigned for each photographed object. In other words, the classification image G5 is a label image in which information for identifying the photographed object is assigned to each pixel. Pixels having the same pixel value represent the same photographed object.

The classification image G5 may be a color image or a grayscale image. In the example of FIG. 18, a pixel value of the classification image G5 is schematically illustrated as a darkness of a dot, and pixels of dots having the same darkness represent the same object. Therefore, pixels representing the bed have a first pixel value. Similarly, pixels representing the walls have a second pixel value, pixels representing the floor have a third pixel value, and pixels representing the painting have a fourth pixel value.

For example, the integration unit 104 groups the feature point cloud P indicated by the observation space information based on the classification image G5. For example, the integration unit 104 generates the observation space image G4, and identifies pixels in the classification image G5 that correspond to the feature point cloud P as in the method described in the embodiment. Then, the integration unit 104 identifies a pixel value of each pixel in the classification image G5, and groups the feature points exhibiting the same value into the same group. In other words, the integration unit 104 assigns information for identifying the group to the three-dimensional coordinates of the feature point cloud P.

According to Modification Example (1) of the present invention, through the use of the information on the classification of the photographed object as the additional information, the point cloud of the observation space OS can be grouped.

(2) Moreover, for example, in the embodiment, there has been described the case in which the normal image G3 is used to finely adjust the mesh M that has been changed based on the depth image G2, but the method of using the normal image G3 is not limited to the above-mentioned example. For example, the integration unit 104 may add the normal information to the three-dimensional coordinates of the feature point cloud P.

FIG. 19 is a diagram for illustrating an example of processing to be executed by the integration unit 104. As illustrated in FIG. 19, the integration unit 104 adds the normal information corresponding to the feature point to each feature point. As described in the embodiment, the integration unit 104 may identify the correspondence between the feature point and the normal information by comparing the observation space image G4 and the normal image G3. For example, the integration unit 104 may increase the amount of information of the observation space OS by mapping, to the feature point, normal information on the straight line connecting the observation viewpoint OV and the feature point (that is, normal information at the same pixel on the image).

In this case, the number of point clouds in the observation space OS is not increased, but the normal information is added, with the result that the integration unit 104 can generate the mesh indicating the surface shape of the photographed object. Further, in combination with the method described in the embodiment, the integration unit 104 may add the normal information to the feature point cloud P while making the observation space OS dense point cloud data. In this manner, the amount of information of the observation space OS can be further increased.

Moreover, for example, there has been described the case in which, as a pixel value of the depth image G2 becomes higher, the depth becomes higher. However, the relationship between the pixel value and the depth may be reversed, and it may be indicated that, as the pixel value becomes lower, the depth becomes deeper. Similarly, the pixel value and the normal of the normal image G3 may have any correspondence under a certain rule.

Further, for example, in the embodiment, there has been described the case in which the observation space information, which is three-dimensional information, is transformed into the observation space image G4, which is two-dimensional information, and then compared with the depth image G2 and the normal image G3, which are two-dimensional information. However, the depth image G2 and the normal image G3 may be transformed into three-dimensional information and then compared with the observation space information. In other words, the integration unit 104 may match the dimensions of the observation space information and the additional information, and then identify a correspondence therebetween to execute processing for integrating the observation space information and the additional information.

Still further, for example, there has been described the case in which the additional information is the information on the form of an image. However, the additional information may have any data format, may be a numerical-value group data that does not take the form of an image, may be data of a list form, and may have various data formats. When information in a form other than the form of an image is used as the additional information, it is not particularly required to execute the processing of comparing the images. Further, the coordinates of the vertices of the mesh may be learned in advance in the machine learning data, and the additional information may be three-dimensional information instead of two-dimensional information like an image. In this case, it is not required to execute the processing of matching the dimensions with the observation space information.

Still further, for example, there has been described the case in which furniture and the like are arranged in a room, but it is not particularly required that the furniture and the like be arranged in the room. Still further, for example, the inside of the room has been described as an example of the real space RS. However, the real space RS may be outdoors, and may be on a street, a parking lot, or an event venue, for example. Still further, for example, there has been described the case in which the observation space OS reproduced by the image processing apparatus 10 is used in the augmented reality. However, the observation space OS may be used in any situation, and may be used for controlling movement of a robot.

(3) Further, for example, there has been described the case in which the image processing system is implemented by one image processing apparatus 10, but the image processing system may include a plurality of computers.

Figure 20:
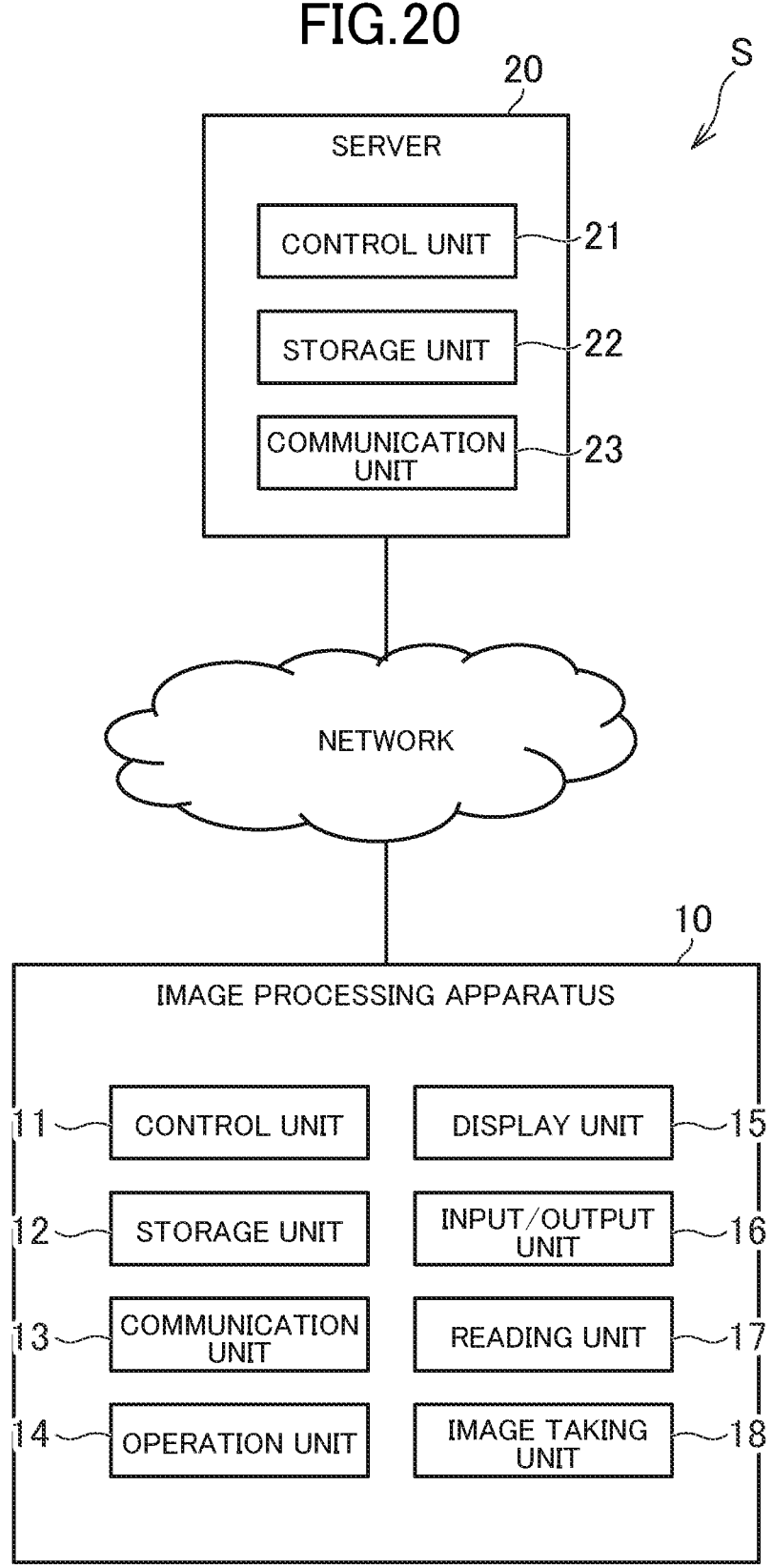
FIG. 20 is a diagram for illustrating an example of an image processing system according to modification examples.

FIG. 20 is a diagram for illustrating an example of the image processing system according to the modification examples. As illustrated in FIG. 20, an image processing system S according to the modification examples includes the image processing apparatus 10 and a server 20. The image processing apparatus 10 and the server 20 are connected to a network, for example, the Internet.

The server 20 is a server computer, and includes a control unit 21, a storage unit 22, and a communication unit 23, for example. Hardware configurations of the control unit 21, the storage unit 22, and the communication unit 23 are similar to those of the control unit 11, the storage unit 12, and the communication unit 13, respectively, and a description thereof is omitted.

The processing described in the embodiment and Modification Examples (1) and (2) described above may be shared between the image processing apparatus 10 and the server 20. For example, the taken image acquisition unit 101 and the observation space information acquisition unit 102 may be implemented in the image processing apparatus 10, and the data storage unit 100, the machine learning unit 103, and the integration unit 104 may be implemented in the server 20. In this case, the data storage unit 100 is implemented mainly by the storage unit 22, and the machine learning unit 103 and the integration unit 104 are implemented mainly by the control unit 21. The server 20 receives the taken images G1 from the image processing apparatus 10. Then, as in the method described in the embodiment, the machine learning unit 103 acquires the additional information, and the integration unit 104 executes the integration processing. Then, the image processing apparatus 10 may receive, from the server 20, a result of the integration processing performed by the integration unit 104.

Moreover, for example, the taken image acquisition unit 101, the observation space information acquisition unit 102, and the machine learning unit 103 may be implemented in the image processing apparatus 10, and the integration unit 104 may be implemented in the server 20. Further, for example, the taken image acquisition unit 101, the observation space information acquisition unit 102, and the integration unit 104 may be implemented in the image processing apparatus 10, and the machine learning unit 103 may be implemented in the server 20. Still further, for example, the taken image acquisition unit 101 may be implemented in the image processing apparatus 10, and the observation space information acquisition unit 102, the machine learning unit 103, and the integration unit 104 may be implemented in the server 20.

Further, for example, all functions of the data storage unit 100, the taken image acquisition unit 101, the observation space information acquisition unit 102, the machine learning unit 103, and the integration unit 104 may be implemented in the server 20. In this case, the server 20 may transmit the observation space information to the image processing apparatus 10.

In FIG. 20, one image processing apparatus 10 and one server 20 are illustrated, and there has been described the case in which two computers are included in the image processing system S. However, three or more computers may be included in the image processing system S. In this case, the respective kinds of processing may be shared among the three or more computers. Moreover, for example, it is not required that the image taking unit 18 be included in the image processing apparatus 10, and the taken image acquisition unit 101 may acquire taken images G1 that have been taken by an image taking unit 18 that is not included in the image processing apparatus 10. Further, the data storage unit 100 may be implemented by a server computer located outside the image processing system, for example.

The invention claimed is:

1. An image processing system, comprising at least one processor configured to:
   acquire taken images that have been taken by a camera, which is movable in a real space;
   acquire, based on changes in position of a feature point cloud in the taken images, observation space information including three-dimensional coordinates of the feature point cloud in an observation space;
   acquire, based on machine learning data on a feature of an object, additional information on a feature of a photographed object shown in the taken images;
   integrate the observation space information and the additional information;
   wherein the additional information includes two-dimensional feature amount information in which a position of the photographed object in the taken images and a feature amount regarding the photographed object are associated with each other,
   estimate a position of the camera based on the changes in position of the feature point cloud, and set an observation viewpoint in the observation space based on a result of the estimation, and
   execute processing based on a result of comparison between two-dimensional observation information, which shows a view of the observation space as seen from the observation viewpoint, and the two-dimensional feature amount information;
   wherein the feature amount includes a depth of the photographed object estimated based on the machine learning data,
   wherein, in the two-dimensional observation information, a position of the feature point cloud in a two-dimensional space, and a depth of the feature point cloud in the observation space are associated with each other, and
   wherein the at least one processor is configured to set a mesh of the photographed object in the observation space based on the two-dimensional feature amount information, and change a scale of the mesh based on the result of the comparison between the two-dimensional observation information and the two-dimensional feature amount information.

2. The image processing system according to claim 1, wherein the at least one processor is configured to partially change the mesh after changing the scale of the mesh based on the result of the comparison between the two-dimensional observation information and the two-dimensional feature amount information.

3. The image processing system according to claim 1, wherein the additional information includes information on a three-dimensional shape of the photographed object, which is estimated based on the machine learning data.

4. The image processing system according to claim 3, wherein the additional information includes information on the mesh of the photographed object.

5. The image processing system according to claim 4, wherein the at least one processor is configured to set the mesh in the observation space based on the additional information, and change the mesh based on the observation space information.

6. The image processing system according to claim 5, wherein the at least one processor is configured to change a first mesh portion of the mesh that corresponds to the three-dimensional coordinates of the feature point cloud indicated by the observation space information, and then change a second mesh portion around the first mesh portion.

7. The image processing system according to claim 5, wherein the at least one processor is configured to:
   estimate a position of the camera based on the changes in position of the feature point cloud, and set an observation viewpoint in the observation space based on a result of the estimation, and
   change a first mesh portion based on an orientation of the first mesh portion with respect to the observation viewpoint.

8. The image processing system according to claim 5, wherein the at least one processor is configured to change scale of the mesh based on the observation space information.

9. The image processing system according to claim 3, wherein the additional information includes information on a normal of the photographed object.

10. The image processing system according to claim 3, wherein the additional information includes information on a classification of the photographed object.

11. The image processing system according to claim 1,
   wherein the camera is configured to take images of the real space based on a predetermined frame rate, and
   wherein the at least one processor is configured to execute processing based on one of the taken images that is taken in the same frame.

12. An image processing method, comprising:
   a taken image acquisition step of acquiring taken images that have been taken by a camera, which is movable in a real space;
   an observation space information acquisition step of acquiring, based on changes in position of a feature point cloud in the taken images, observation space information including three-dimensional coordinates of the feature point cloud in an observation space;
   a machine learning step of acquiring, based on machine learning data on a feature of an object, additional information on a feature of a photographed object shown in the taken images; and an integration step of integrating the observation space information and the additional information;

wherein the additional information includes two-dimensional feature amount information in which a position of the photographed object in the taken images and a feature amount regarding the photographed object are associated with each other, an estimate step of estimating a position of the camera based on the changes in position of the feature point cloud, and setting an observation viewpoint in the observation space based on a result of the estimation, and an execute step of executing processing based on a result of comparison between two-dimensional observation information, which shows a view of the observation space as seen from the observation viewpoint, and the two-dimensional feature amount information;

wherein the feature amount includes a depth of the photographed object estimated based on the machine learning data, wherein, in the two-dimensional observation information, a position of the feature point cloud in a two-dimensional space, and a depth of the feature point cloud in the observation space are associated with each other, and wherein the at least one processor is configured to set a mesh of the photographed object in the observation space based on the two-dimensional feature amount information, and change a scale of the mesh based on the result of the comparison between the two-dimensional observation information and the two-dimensional feature amount information.

13. A non-transitory computer-readable information storage medium for storing a program for causing a computer to:

acquire taken images that have been taken by a camera, which is movable in a real space;

acquire, based on changes in position of a feature point cloud in the taken images, observation space information including three-dimensional coordinates of the feature point cloud in an observation space;

acquire, based on machine learning data on a feature of an object, additional information on a feature of a photographed object shown in the taken images; and integrate the observation space information and the additional information;

wherein the additional information includes two-dimensional feature amount information in which a position of the photographed object in the taken images and a feature amount regarding the photographed object are associated with each other, estimate a position of the camera based on the changes in position of the feature point cloud, and set an observation viewpoint in the observation space based on a result of the estimation, and execute processing based on a result of comparison between two-dimensional observation information, which shows a view of the observation space as seen from the observation viewpoint, and the two-dimensional feature amount information;

wherein the feature amount includes a depth of the photographed object estimated based on the machine learning data, wherein, in the two-dimensional observation information, a position of the feature point cloud in a two-dimensional space, and a depth of the feature point cloud in the observation space are associated with each other, and wherein the at least one processor is configured to set a mesh of the photographed object in the observation space based on the two-dimensional feature amount information, and change a scale of the mesh based on the result of the comparison between the two-dimensional observation information and the two-dimensional feature amount information.

* * * * *